US012103040B2

(12) United States Patent
Sato et al.

(10) Patent No.: US 12,103,040 B2
(45) Date of Patent: Oct. 1, 2024

(54) VIBRATION GENERATING DEVICE

(71) Applicant: ALPS ALPINE CO., LTD., Tokyo (JP)

(72) Inventors: Kunio Sato, Miyagi (JP); Hiroshi Wakuda, Miyagi (JP); Tadamitsu Sato, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 413 days.

(21) Appl. No.: 17/446,351

(22) Filed: Aug. 30, 2021

(65) Prior Publication Data

US 2021/0387231 A1 Dec. 16, 2021

Related U.S. Application Data

(63) Continuation of application No. PCT/JP2020/007014, filed on Feb. 21, 2020.

(30) Foreign Application Priority Data

Mar. 14, 2019 (JP) ................................ 2019-047616

(51) Int. Cl.
*H04R 9/02* (2006.01)
*B06B 1/04* (2006.01)

(52) U.S. Cl.
CPC ............ *B06B 1/045* (2013.01); *H04R 9/025* (2013.01)

(58) Field of Classification Search
CPC .. B06B 1/04; H04R 9/025; H04R 7/16; H04R 13/00
See application file for complete search history.

(56) References Cited

U.S. PATENT DOCUMENTS

| | | | | |
|---|---|---|---|---|
| 7,301,094 | B1 | 11/2007 | Noro et al. | |
| 8,653,352 | B2 | 2/2014 | Wauke | |
| 2002/0064295 | A1 | 5/2002 | Kobayashi et al. | |
| 2005/0157905 | A1* | 7/2005 | Beer ...................... | H04R 17/00 381/431 |
| 2018/0279027 | A1* | 9/2018 | Peace, Jr. ............... | H04R 1/025 |

FOREIGN PATENT DOCUMENTS

| | | | |
|---|---|---|---|
| JP | 2001-121079 | | 5/2001 |
| JP | 2004-297923 | | 10/2004 |
| JP | 2013-056309 | | 3/2013 |
| JP | 2016-082536 | | 5/2016 |
| JP | 2016-096677 | | 5/2016 |
| JP | 2019025390 | A * | 2/2019 |

OTHER PUBLICATIONS

JP 2019025390 A NPL (Year: 2019).*
Extended European Search Report for EP20770919.7 mailed on Oct. 20, 2022.
International Search Report for PCT/JP2020/007014 mailed on Apr. 21, 2020.

* cited by examiner

*Primary Examiner* — Bryan R Perez
(74) *Attorney, Agent, or Firm* — IPUSA, PLLC

(57) ABSTRACT

A vibration generating device includes a housing; a diaphragm supported by the housing, and configured to generate sound by vibrating in a first direction; and a vibration providing part attached to the housing, and configured to vibrate the housing. The vibration providing part vibrates the housing in the first direction at a first frequency, and vibrates the housing in a second direction at a second frequency lower than the first frequency.

13 Claims, 22 Drawing Sheets

VIBRATION GENERATING DEVICE

CROSS-REFERENCE TO RELATED APPLICATION

The present U.S. non-provisional application is a continuation application of and claims the benefit of priority under 35 U.S.C. § 365(c) from PCT International Application PCT/JP2020/007014 filed on Feb. 21, 2020, which is designated the U.S., and is based upon and claims the benefit of priority of Japanese Patent Application No. 2019-047616 filed on Mar. 14, 2019, the entire contents of which are incorporated herein by reference.

BACKGROUND OF THE INVENTION

1. Field of the Invention

The present disclosure relates to a vibration generating device.

2. Description of the Related Art

Japanese Laid-Open Patent Application No. 2001-121079 (Patent Document 1) discloses a vibration source drive device that has an object to generate sound and vibration exclusively.

However, even if adopting the vibration source drive device disclosed in Patent Document 1, it is difficult to generate sound and vibration that are sufficiently separated.

SUMMARY

According to an embodiment in the present disclosure, a vibration generating device includes a housing; a diaphragm supported by the housing, and configured to generate sound by vibrating in a first direction; and a vibration providing part attached to the housing, and configured to vibrate the housing, wherein the vibration providing part vibrates the housing in the first direction at a first frequency, and vibrates the housing in a second direction at a second frequency lower than the first frequency.

DESCRIPTION OF THE PREFERRED EMBODIMENTS

In the following, embodiments in the present disclosure will be described with reference to the accompanying drawings.

According to the present disclosure, sound and vibration that are sufficiently separated can be presented.

Note that throughout the description and the drawings, for elements having substantially the same functional configurations, duplicate descriptions may be omitted by attaching the same reference codes.

First Embodiment

Figure 1A:
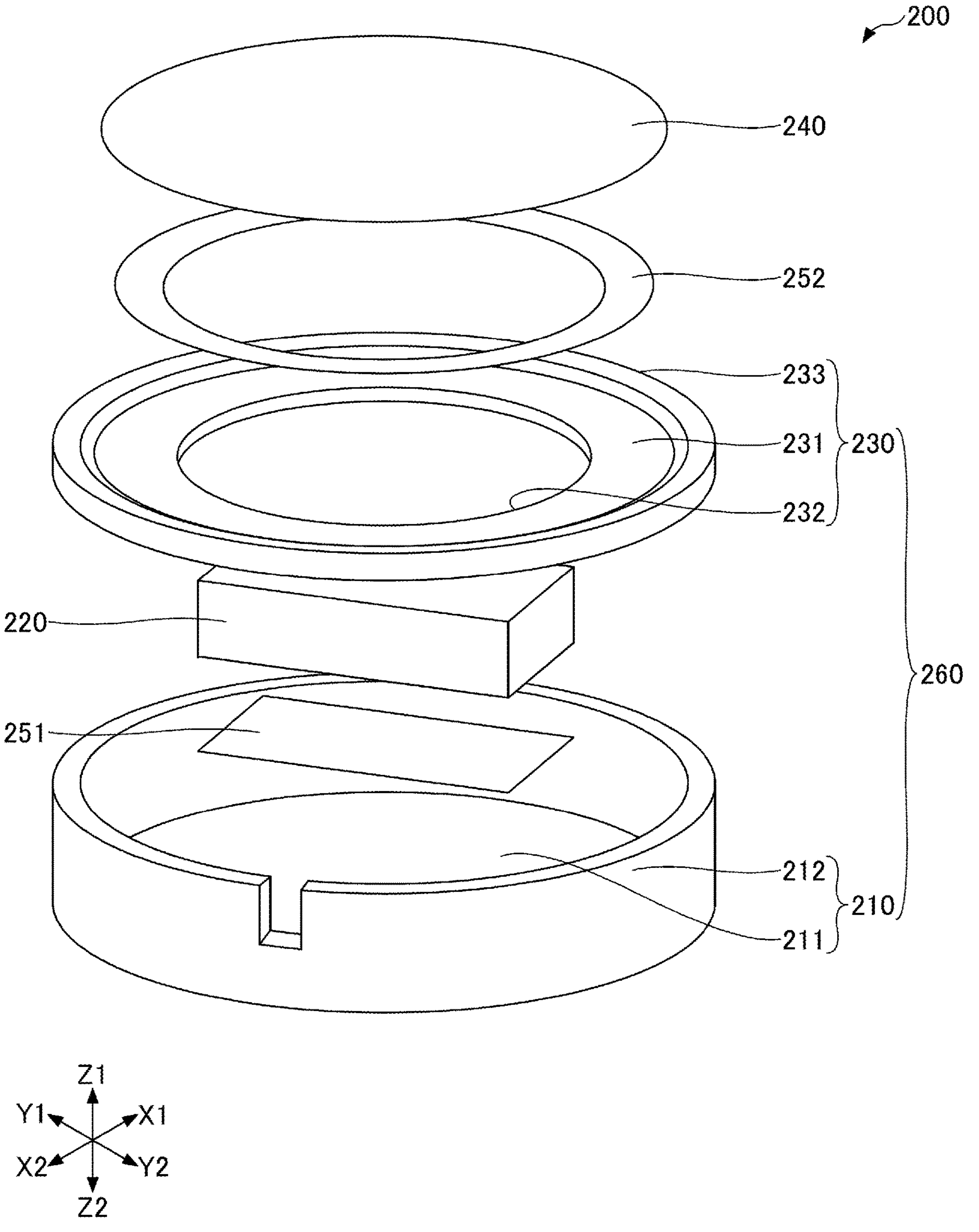
FIG. 1A is an exploded perspective view illustrating a configuration of a vibration generating device according to a first embodiment.
Figure 1B:
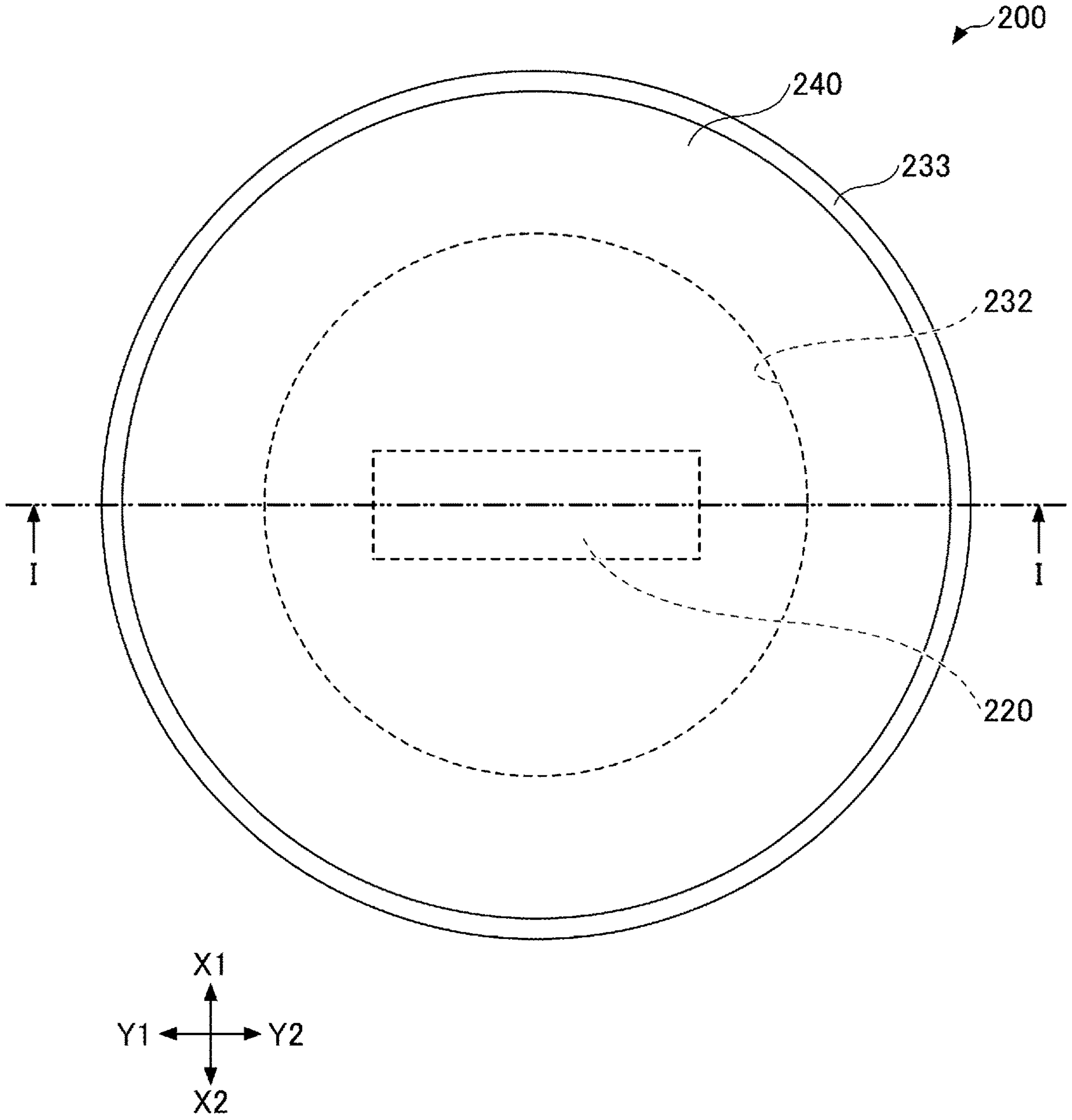
FIG. 1B is a plan view illustrating the configuration of the vibration generating device according to the first embodiment.
Figure 1C:
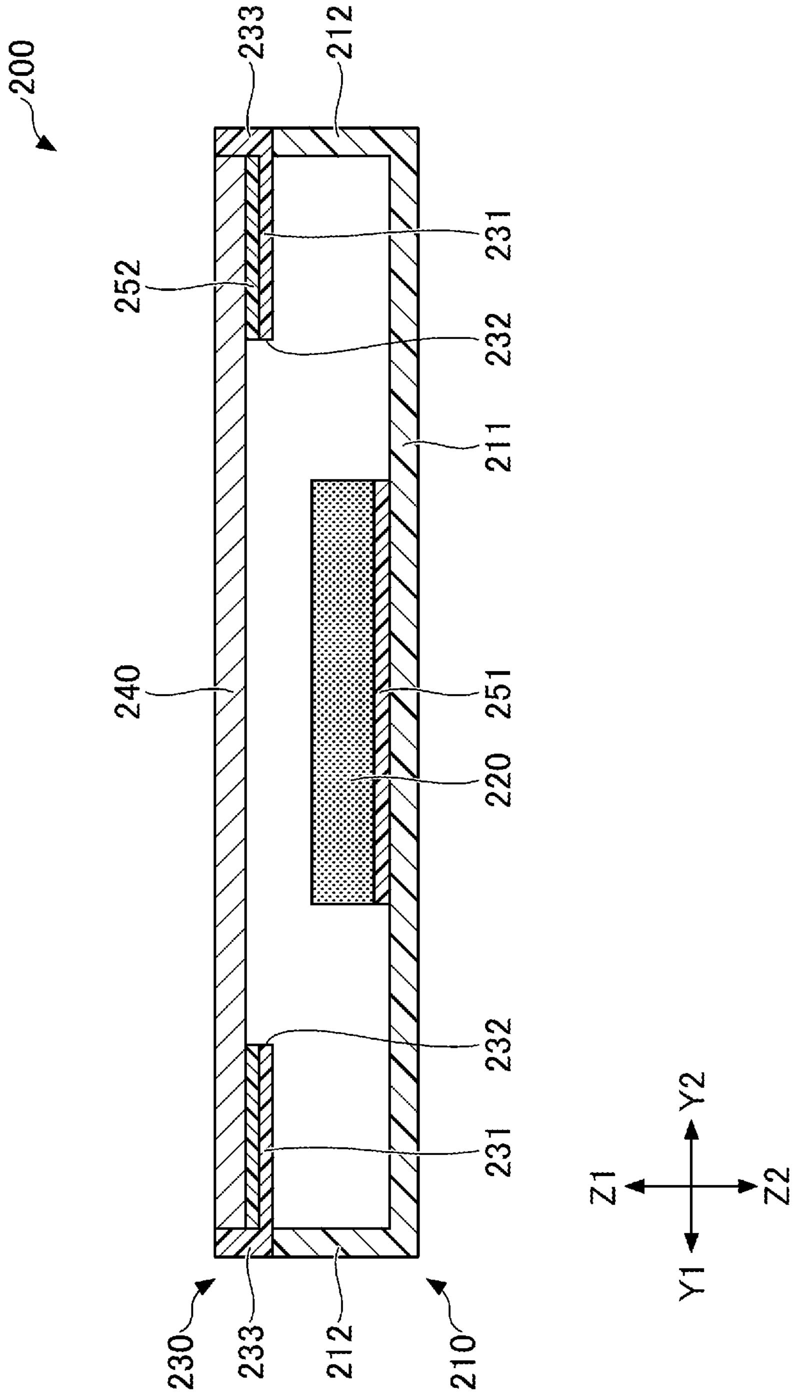
FIG. 1C is a cross-sectional view illustrating the configuration of the vibration generating device according to the first embodiment.

First, a first embodiment will be described. FIGS. 1A, 1B, and 1C are diagram illustrating a configuration of a vibration generating device 200 according to a first embodiment. FIG. 1A is an exploded perspective view; FIG. 1B is a plan view; and FIG. 1C is a cross-sectional view along a I-I line in FIG. 1B. Note that the directions in each figure are defined as X1 being left, X2 being right, Y1 being front, Y2 being rear, Z1 being upward, and Z2 being downward.

As illustrated in FIGS. 1A, 1B, and 1C, the vibration generating device 200 according to the first embodiment has a lower case 210, a vibration providing part 220, an upper case 230, and a diaphragm 240. The lower case 210 and the upper case 230 are included in a housing 260. The lower case 210 has a disk-shaped bottom plate 211 and a cylinder-shaped side plate 212 extending upward from an edge of the bottom plate 211. The vibration providing part 220 is fixed to the top surface of the bottom plate 211 by a double-sided tape 251. The upper case 230 has a ring-shaped bottom plate 231 having an opening 232 famed at the center, and a guide part 233 provided at an edge of the bottom plate 231 to guide the diaphragm 240. The diaphragm 240 has a disk shape, and is fixed to the top surface of the bottom plate 231 by a ring-shaped double-sided tape 252 inside the guide part 233, to be held by the upper case 230. For example, the upper case 230 is fixed to the lower case 210 so that the diaphragm 240 is positioned on the upside with respect to the upper case 230. The upper case 230 may be fixed to the lower case 210 so that the diaphragm 240 is positioned on the lower side with respect to the upper case 230. The upper case 230 is an example of a holder.

The diaphragm 240 is supported by the housing 260, and generates sound by vibrating in a first direction (the Z1-Z2 direction). The vibration providing part 220 is attached to the housing 260, to vibrate the housing 260. The vibration providing part 220 vibrates the housing 260 in the first direction at the first frequency f1, and vibrates the housing 260 in a second direction at a second frequency f2 that is lower than the first frequency f1. For example, the second direction is a direction different from the first direction, and favorably is a direction (the X1-X2 direction or the Y1-Y2 direction) orthogonal to the first direction (the Z1-Z2 direction).

For example, the diaphragm 240 can be integrally formed with the housing 260. For example, the diaphragm 240 can be integrally formed with the upper case 230. Also, for example, the housing 260 and the diaphragm 240 are made of synthetic resin or made of metal.

In the vibration generating device 200, the housing 260 vibrating in the first direction causes the diaphragm 240 to vibrate in the first direction, and the diaphragm 240 vibrating the surrounding air generates sound. The first frequency f1 is not limited in particular, and may be set to be, for example, greater than or equal to 200 Hz and less than or equal to 6 kHz; in particular, it is favorable that the range is set to be, for example, greater than or equal to 1 kHz and less than or equal to 4 kHz that can be easily detected by the auditory perception of a person. Even if the housing 260 vibrates at a frequency in a range that can be easily detected by the auditory perception of a person, the vibration is hardly detected by the person through the tactile perception. Therefore, vibration at the first frequency f1 in the first direction can present sound to a person without causing the person to feel the vibration substantially.

Also, the second frequency f2 is not limited in particular, and may be set to be, for example, less than or equal to 600 Hz; in particular, it is favorable that the range is set to be, for example, greater than or equal to 100 Hz and less than or equal to 500 Hz that can be easily detected by the tactile perception of a person. Even in the case where the first frequency f1 is greater than or equal to 200 Hz and less than or equal to 600 Hz, the second frequency f2 simply needs to be lower than the first frequency f1. In some cases, the auditory perception of a person can detect frequencies of sound that are easily detected by the tactile perception; however, when vibrating in the second direction, the diaphragm 240 hardly vibrates in the first direction, and thereby, the diaphragm 240 does not generate sound. Therefore, vibration at the second frequency f2 in the second direction can present vibration to a person without causing the person to feel sound substantially.

Figure 2A:
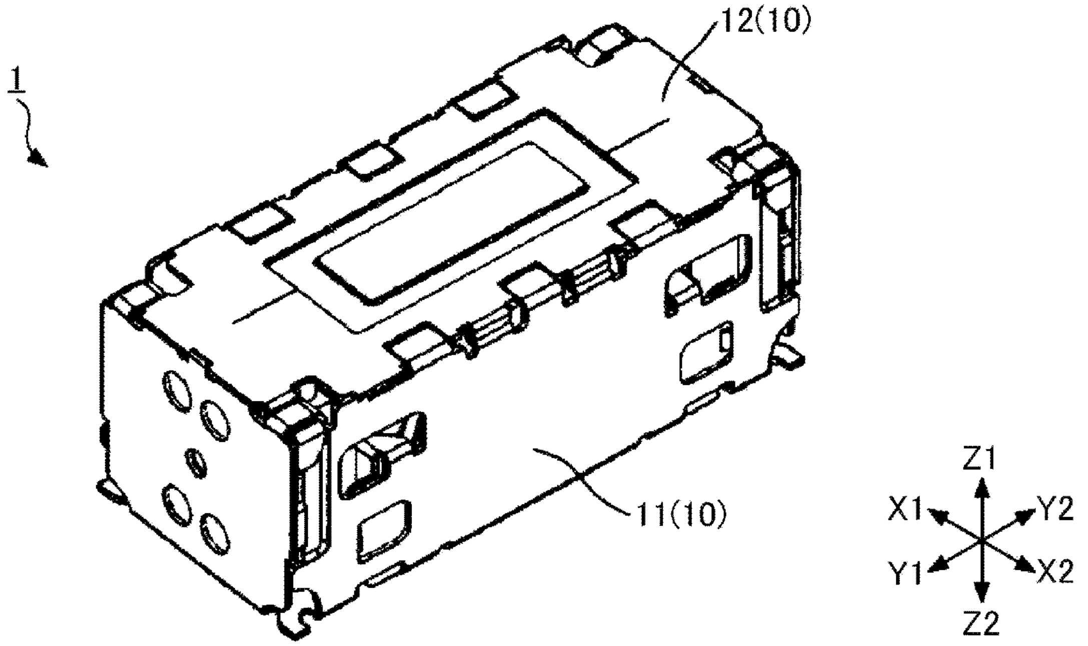
FIG. 2A is a perspective view illustrating an external appearance of a first example of a vibration providing part.
Figure 2B:
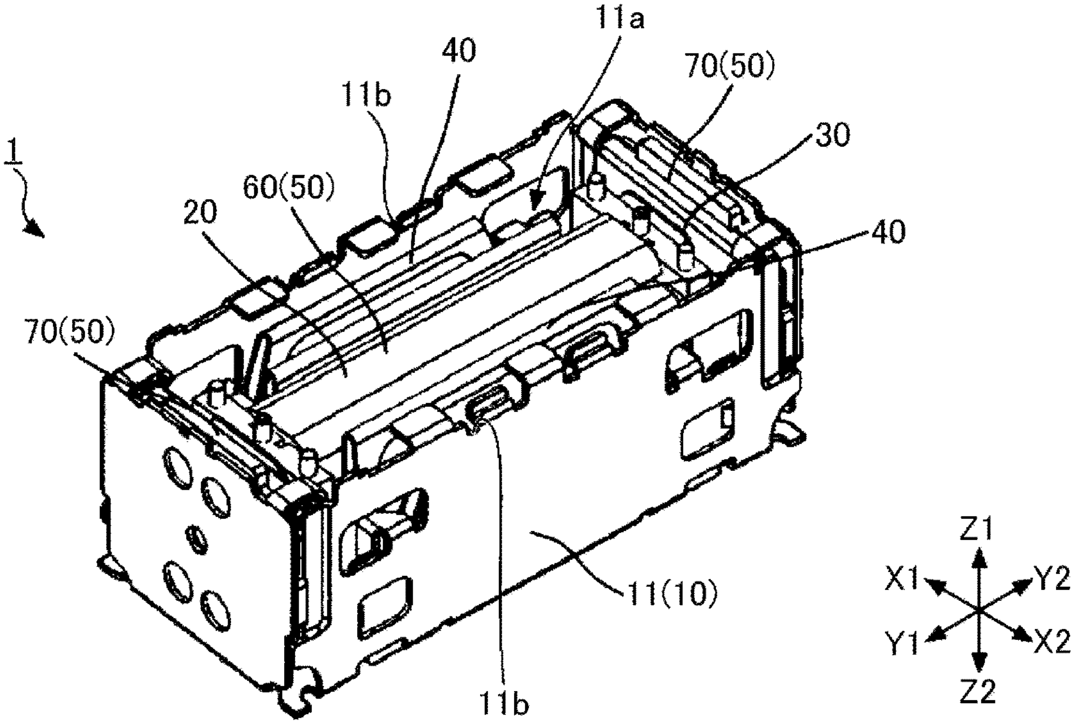
FIG. 2B is a perspective view illustrating a state in which the cover is removed from the first example of the vibration providing part.
Figure 3:
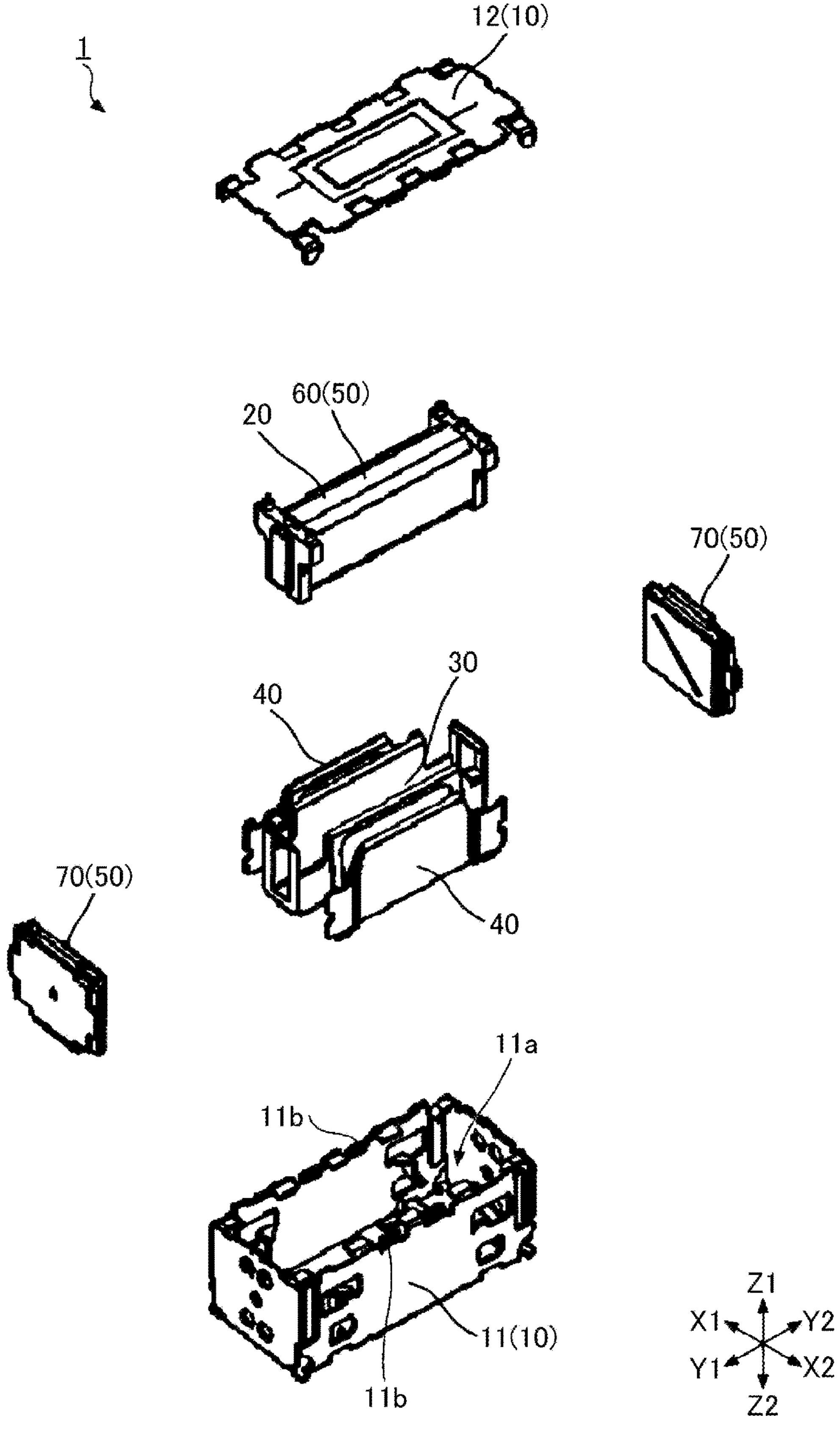
FIG. 3 is an exploded perspective view illustrating a configuration of the first example of the vibration providing part.
Figure 4:
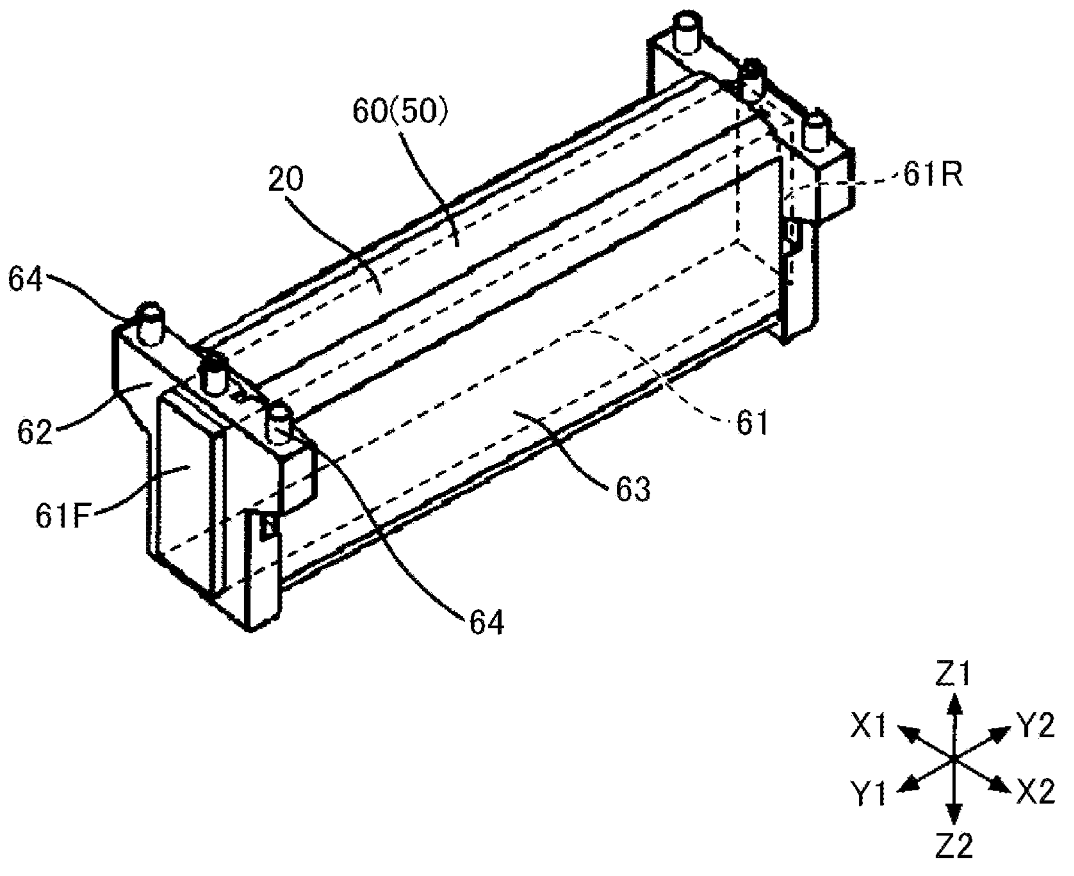
FIG. 4 is a perspective view illustrating a configuration of a vibrator in the first example of the vibration providing part.

Here, the vibration providing part 1 according to the first example of the vibration providing part 220 will be described. FIGS. 2A and 2B are first explanatory diagrams illustrating a configuration of the vibration providing part 1. FIG. 2A is a perspective view illustrating an external appearance of the vibration providing part 1; and FIG. 2B is a perspective view illustrating the vibration providing part 1 in a state of a cover 12 being removed. FIG. 3 is a second explanatory diagram illustrating the configuration of the vibration providing part 1, and is an exploded perspective view of the vibration providing part 1. FIG. 4 is an explanatory diagram illustrating a configuration of the vibrator 20 in the vibration providing part 1, and is a perspective view of the vibrator 20.

Figure 5A:
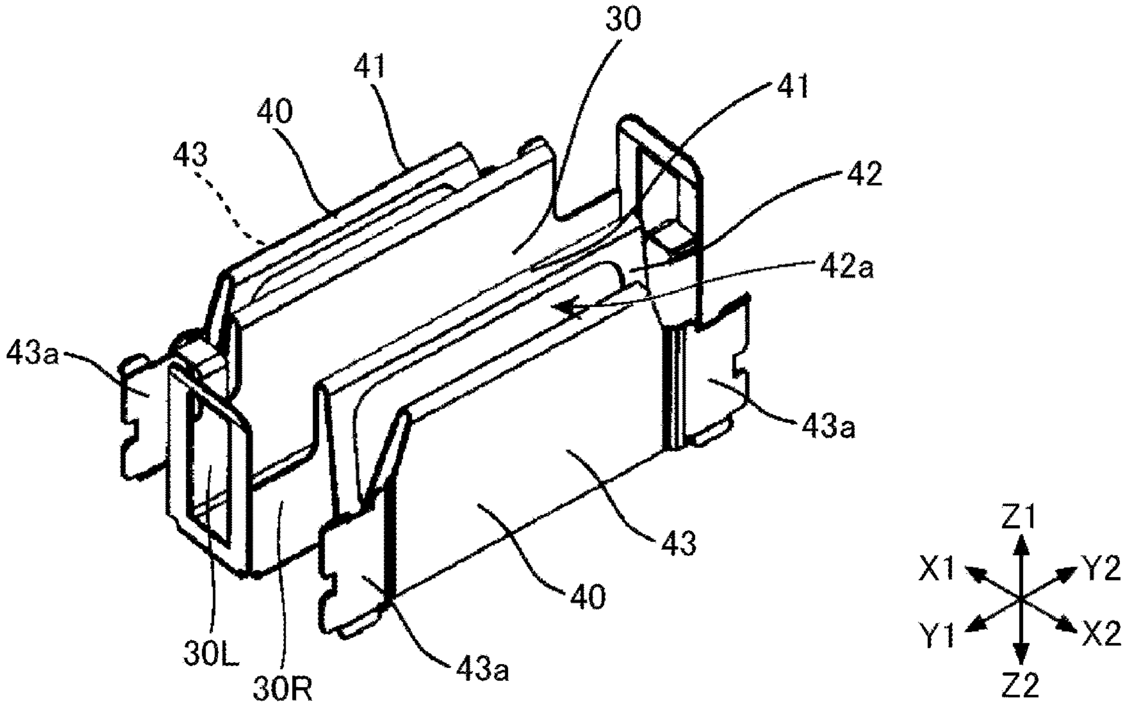
FIG. 5A is a perspective view illustrating a configuration of a holder and an elastic supporter in the first example of the vibration providing part.
Figure 5B:
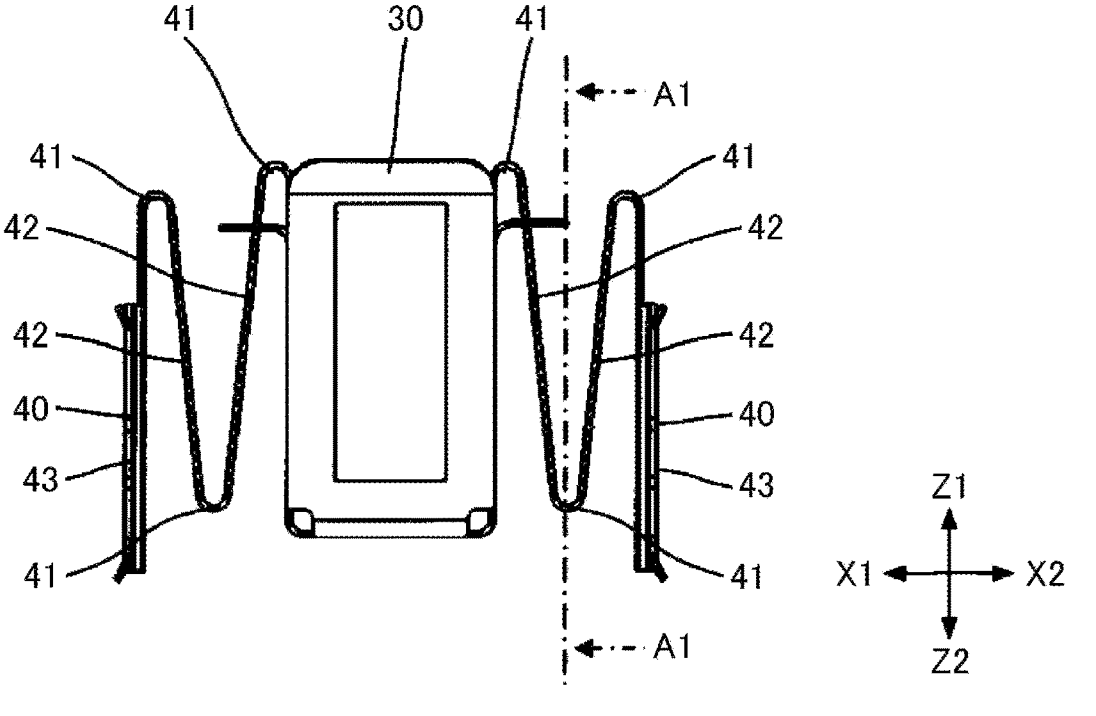
FIG. 5B is a front view illustrating the configuration of the holder and the elastic supporter in the first example of the vibration providing part.
Figure 6A:
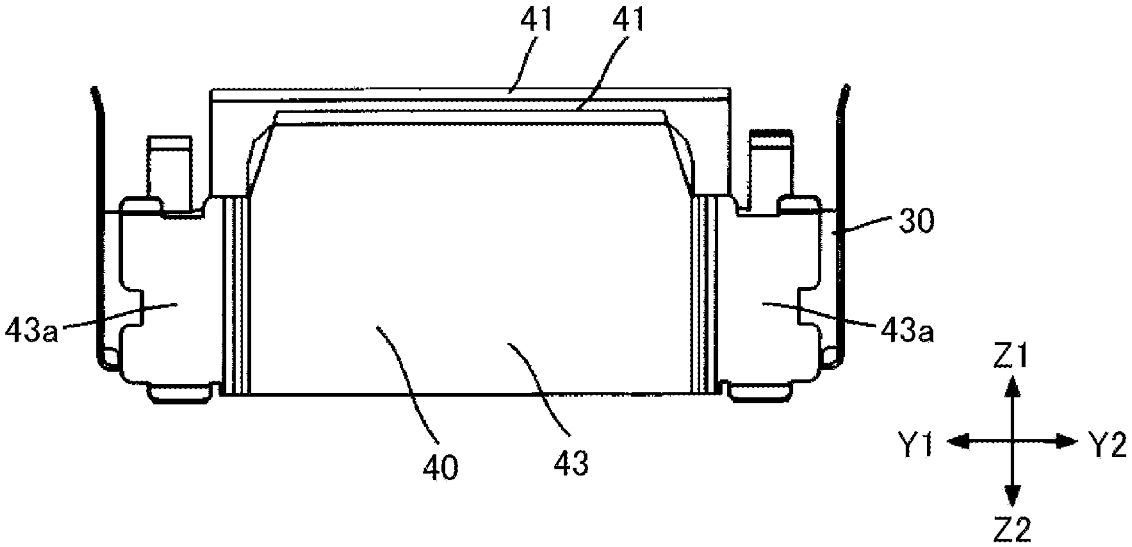
FIG. 6A is a side view illustrating the configuration of the holder and the elastic supporter in the first example of the vibration providing part.
Figure 6B:
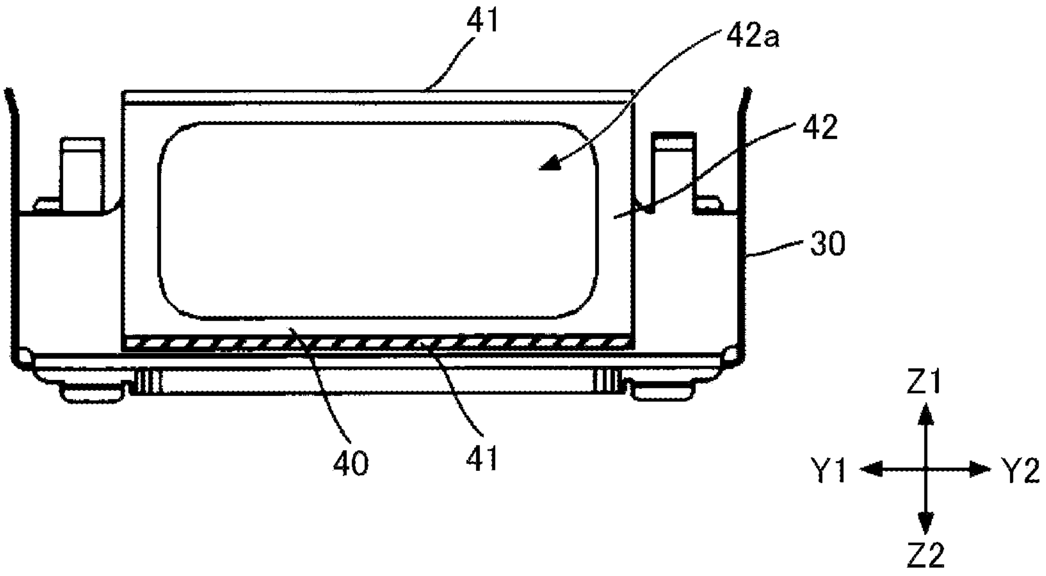
FIG. 6B is a cross-sectional view illustrating the configuration of the holder and the elastic supporter in the first example of the vibration providing part.
Figure 7A:
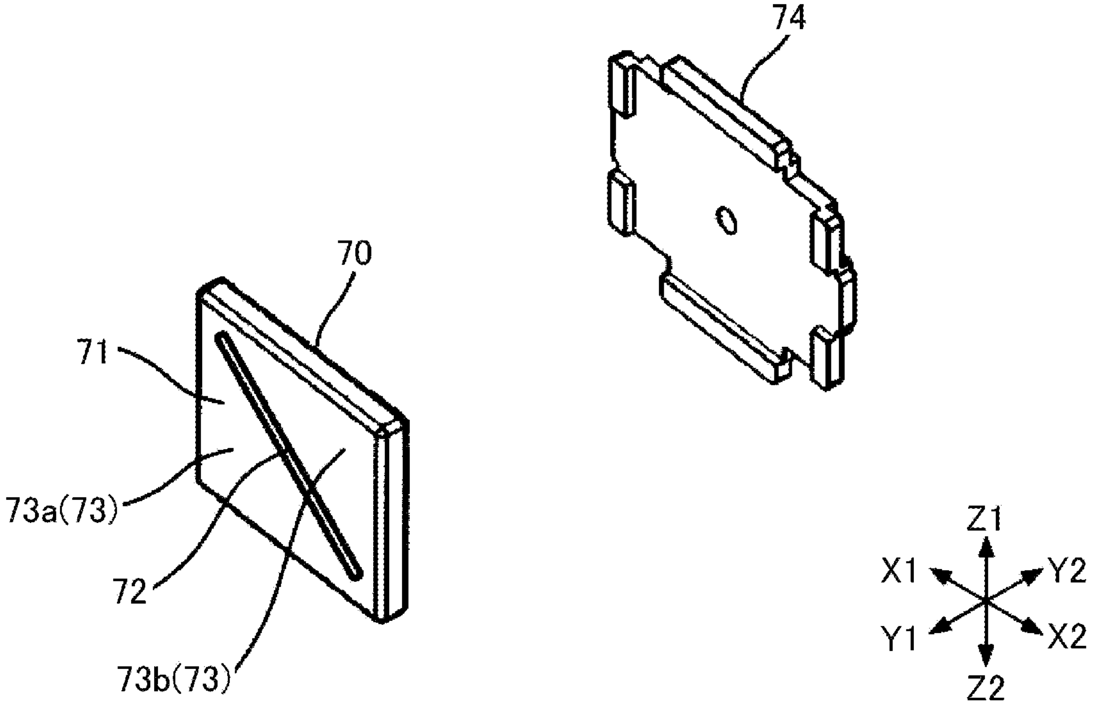
FIG. 7A is an exploded perspective view illustrating a configuration of a permanent magnet in the first example of the vibration providing part.
Figure 7B:
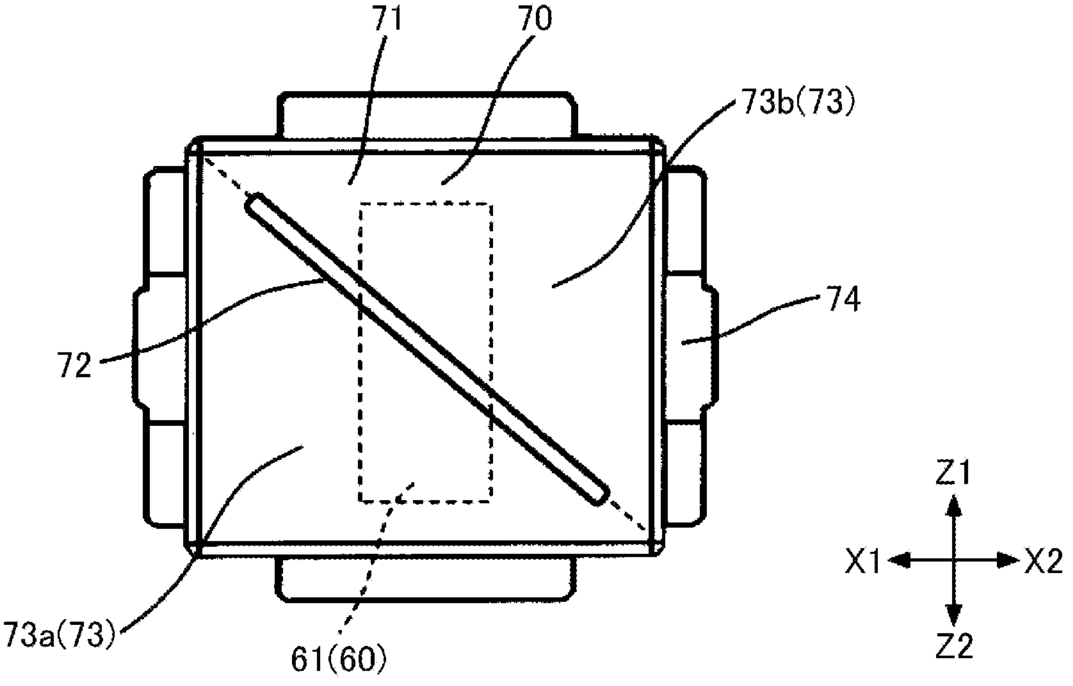
FIG. 7B is a front view illustrating the configuration of the permanent magnet in the first example of the vibration providing part.

FIGS. 5A and 5B are first explanatory diagrams illustrating a configuration of the holder 30 and the elastic supporter 40 in the vibration providing part 1. FIG. 5A is a perspective view of the holder 30 and the elastic supporter 40; and FIG. 5B is a front view of the holder 30 and the elastic supporter 40 in the vibration providing part 1. FIGS. 6A and 6B are second explanatory diagrams illustrating a configuration of the holder 30 and the elastic supporter 40 in the vibration providing part 1. FIG. 6A is a side view in the case of viewing the holder 30 and the elastic supporter 40 from the right; and FIG. 6B is a cross-sectional view corresponding to a cross section of FIG. 5B along a cross section A1-A1. FIGS. 7A and 7B are explanatory diagrams illustrating a configuration of the permanent magnet in the vibration providing part 1. FIG. 7A is an exploded perspective view of the permanent magnet 70 on the rear side; FIG. 7B is a front view of the permanent magnet 70 on the rear side.

Figure 8A:
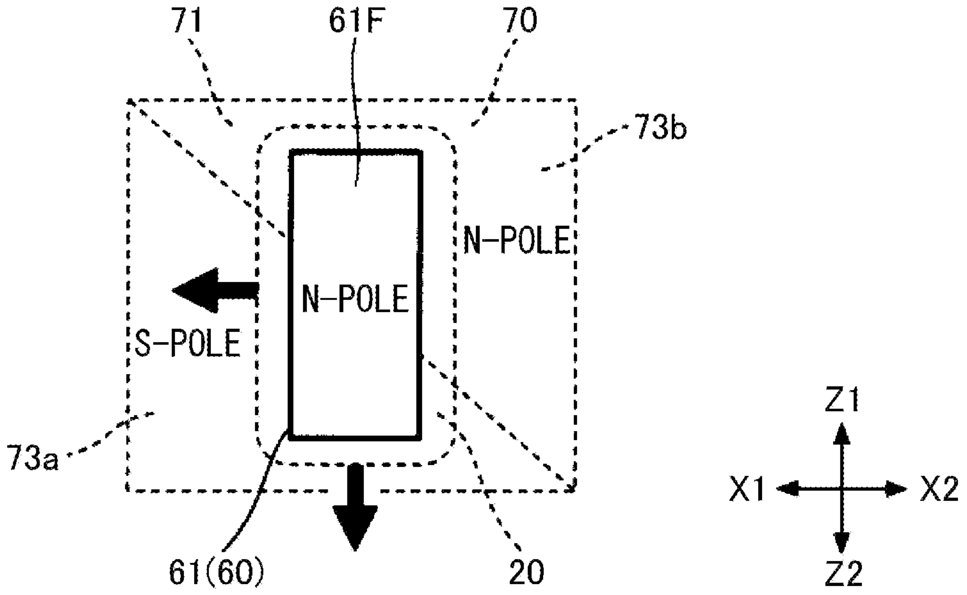
FIG. 8A is a first explanatory diagram illustrating driving directions of a magnetic drive part in the first example of the vibration providing part.
Figure 8B:
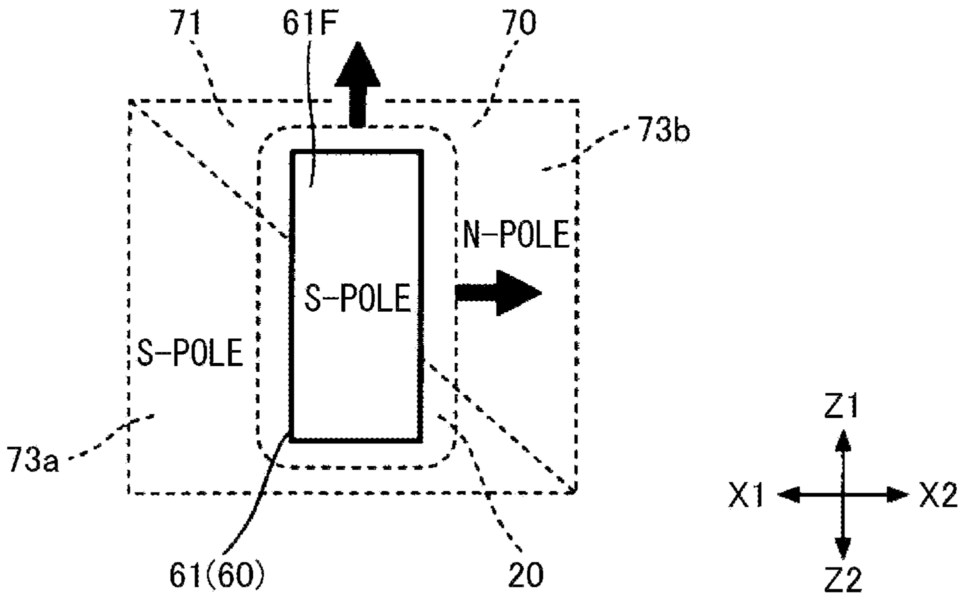
FIG. 8B is a second explanatory diagram illustrating driving directions of the magnetic drive part in the first example of the vibration providing part.

FIGS. 8A and 8B are explanatory diagrams illustrating driving directions of the magnetic drive part 50 in the vibration providing part 1, in which the magnetic core 61 is viewed from the front. FIG. 8A illustrates a direction of a magnetic force exerted by the permanent magnet 70 on the front edge 61F of the core 61 when the front edge 61F of the core 61 is magnetized to be an N pole; and FIG. 8B illustrates a direction of a magnetic force exerted by the permanent magnet 70 on the front edge 61F of the core 61 when the front edge 61F of the core 61 is magnetized to be an S pole. In FIGS. 8A and 8B, a solid-line arrow indicates a direction of a magnetic force acting on the magnetic core 61.

Figure 9A:
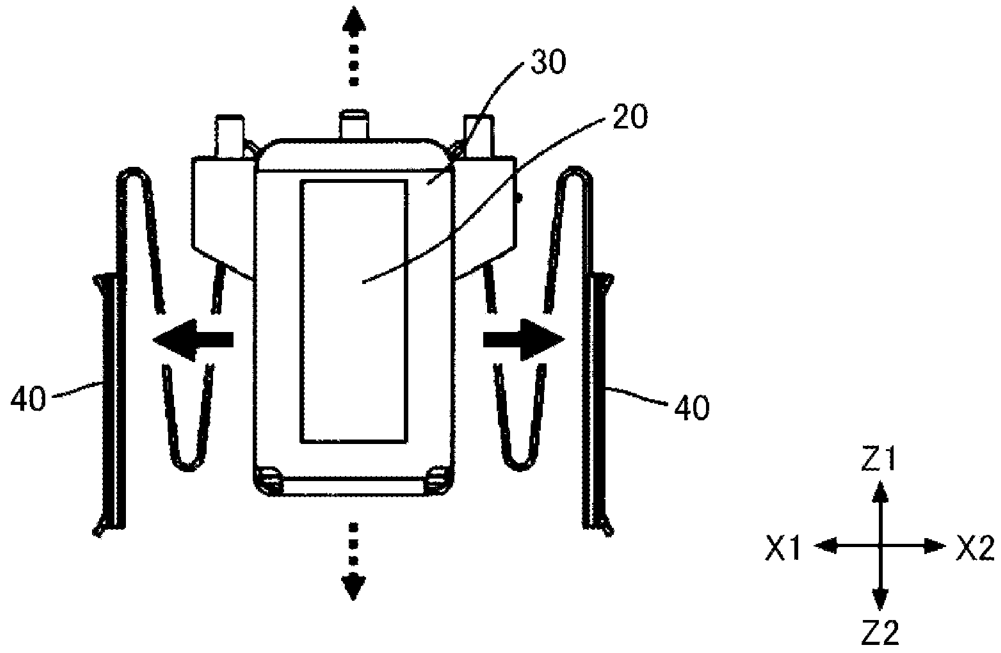
FIG. 9A is a first explanatory diagram illustrating driving directions in the first example of the vibration providing part.
Figure 9B:
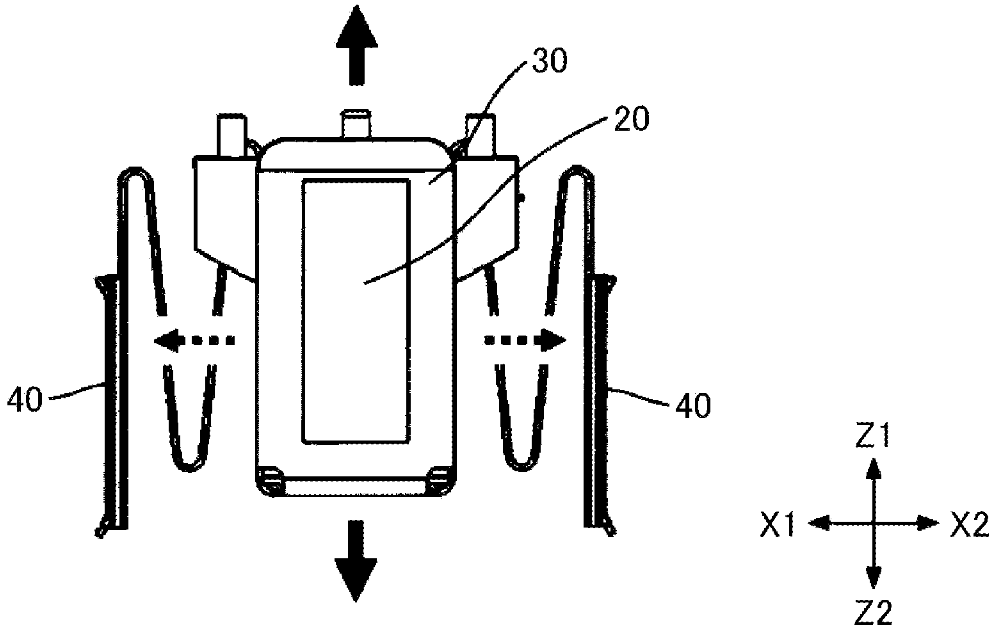
FIG. 9B is a second explanatory diagram illustrating driving directions in the first example of the vibration providing part.

FIGS. 9A and 9B are explanatory diagram illustrating vibration directions of the vibrator 20 in the vibration providing part 1, in which the vibrator 20, the holder 30, and the elastic supporter 40 are viewed from the front. FIG. 9A illustrates a vibration direction of the vibrator 20 when the electromagnet 60 generates an alternating magnetic field at the same frequency as the first natural frequency; and FIG. 9B illustrates a vibration direction of the vibrator 20 when the electromagnet 60 generates an alternating magnetic field at the same frequency as the second natural frequency. In FIGS. 9A and 9B, a solid-line arrow indicates a direction in which it is easier for the vibrator 20 to generate vibration, namely, the vibration direction of the vibrator 20, and a dashed-line arrow indicates a direction in which it is difficult for the vibrator 20 to generate vibration.

In the vibration providing part 1 according to the first example, the Z1-Z2 direction is an example of a first direction; the X1-X2 direction is an example of a second direction; and the Y1-Y2 direction is an example of a third direction.

First, a configuration of the vibration providing part 1 will be described by using FIGS. 2A, 2B, 3, 4, 5A, 5B, 6A, 6B, 7A, and 7B. As illustrated in FIGS. 2A, 2B, and 3, the vibration providing part 1 includes a housing 10, the vibrator 20, the holder 30, the two elastic supporters 40, and the magnetic drive part 50.

As illustrated in FIGS. 2A, 2B, and 3, the housing 10 is constituted by combining a main body 11 and the cover 12. The main body 11 is a box-like member having generally a rectangular shape formed by processing a metal plate, and has a container 11*a* as a recessed part that is generally a rectangular parallelepiped, and recessed downward from an upper end 11*b* of the main body 11. The cover 12 is a plate-like member having generally rectangular shape formed by processing a metal plate, and is attached to the upper end 11*b* of the main body 11 to cover the container 11*a* from the top. The housing 10 is an example of an inside housing.

As illustrated in FIGS. 2B, 3, and 4, the vibrator 20 is a member having generally a rectangular shape contained in the container 11*a* of the housing 10. In the vibrator 20, the electromagnet 60 as part of the magnetic drive part 50 is arranged.

The holder 30 and the elastic supporter 40 are integrally formed by processing a metal plate having a spring property, to have a predetermined shape. As illustrated in FIGS. 5A, 5B, 6A, and 6B, the holder 30 is a box-like part being generally a rectangular parallelepiped. As illustrated in FIGS. 2B and 3, in the holder 30, the lower part of the vibrator 20 is contained to be held.

As illustrated in FIGS. 5A, 5B, 6A, and 6B, the elastic supporter 40 is a plate spring formed by folding a metal plate extending in the left-right direction multiple times so as to have the folds extend along the front-back direction. Among the two elastic supporters 40, one extends from the left end 30L of the holder 30 to the left side, and the other extends from the right end 30R of the holder 30 to the right side. In the following, the elastic supporter 40 extending from the left end 30L of the holder 30 to the left side will be referred to as the elastic supporter 40 on the left side; and the elastic supporter 40 extending from the right end 30R of the holder 30 to the right side will be referred to as the elastic supporter 40 on the right side.

Also, as illustrated in FIGS. 5A, 5B, 6A, and 6B, the elastic supporter 40 has three folded parts 41, two flat parts 42, and an attachment 43. The folded part 41 is a part at which the metal plate is folded along a folds. The flat part 42 is a part having generally a rectangular shape extending from one of the three folded parts 41 to another, and has sides along the direction of the folds and sides along the extending direction. Further, the elastic supporter 40 is formed so as to make a dimension along the direction of the folds of the flat part 42 (referred to as the width dimension of the flat part 42, hereafter) greater than a dimension along the extending direction of the flat part 42 (referred to as the length dimension of the flat part 42, hereafter). Also, an opening 42*a* having generally a rectangular shape is formed at a position away from the outer periphery of the flat part 42.

Note that a plate spring having such a folded structure as in the elastic supporter 40, has a feature in that elastic deformation occurs more easily in directions orthogonal to the folds (the left-right direction and the up-down direction). In other words, such a plate spring can be elastically deformed along the left-right direction due to expansion and contraction, and elastically deformed along the up-down direction by deflection. On the other hand, such a plate spring also has a feature in that deformation hardly occurs in the direction along the folds (in the front-back direction), and hence, is suitable as a member for suppressing movement along the front-back direction.

Also, in a plate spring having such a folded structure, elastic deformation along the left-right direction due to expansion and contraction is normally more likely to occur, compared to elastic deformation along the up-down direction due to deflection. Therefore, defining the modulus of elasticity of the elastic supporter 40 in the left-right direction as the first modulus of elasticity, and defining the modulus of elasticity of the elastic supporter 40 in the up-down direction as the second modulus of elasticity, then, the first modulus of elasticity and the second modulus of elasticity take values different from each other.

The attachment 43 is formed at the tip of the elastic supporter 40. An engaging claw part 43*a* is formed at a predetermined position of the attachment 43. Further, by having of the engaging claw part 43*a* engaged with the main body 11 of the housing 10, the elastic supporter 40 is attached to the housing 10. Further, by elastic deformation along the left-right direction and along the up-down direction, the elastic supporter 40 supports the vibrator 20 to be capable of vibrating along the left-right direction and along the up-down direction.

Note that being supported by the elastic supporter 40, the vibrator 20 vibrates along the left-right direction at the first natural frequency that is determined according to the first modulus of elasticity and the mass of the vibrator 20, and vibrates along the up-down direction at the second natural frequency that is determined according to the second modulus of elasticity and the mass of the vibrator 20. Further, as the first modulus of elasticity and the second modulus of elasticity take different values from each other, the first natural frequency and the second natural frequency take different values from each other.

As illustrated in FIG. 3, the magnetic drive part 50 is configured to include the electromagnet 60 arranged facing the vibrator 20 (a first magnetic field generating part), and the two permanent magnets 70 arranged facing the housing 10 (a second magnetic field generating part). As illustrated in FIG. 4, the electromagnet 60 has a magnetic core 61, a bobbin 62, a coil 63, and a terminal 64. The magnetic core 61 is a member having a prismatic shape made of a ferromagnetic material, and extends along the front-back direction. The bobbin 62 is a member having a cylindrical shape made of an insulator, and covers the outer periphery of the core 61. The coil 63 is formed by winding a wire around the outer periphery of the bobbin 62. The terminal 64 connects both ends of the coil 63 to an external circuit (not illustrated) via a member for wiring (not illustrated).

The electromagnet 60 generates a magnetic field along the front-back direction by causing an alternating current to flow through the coil 63, to magnetize the front edge 61F and the rear edge 61R of the core 61 to have different poles. Further, by adopting an alternating current as the current flowing through the coil 63, the magnetic field generated by the electromagnet 60 is an alternating magnetic field in which the direction of the magnetic field changes in response to change in the direction of the current. Further, when the front edge 61F of the core 61 is serving as an S pole, the rear edge 61R is serving as an N pole, and when the front edge 61F of the core 61 is serving as an N pole, the rear edge 61R is serving as an S pole. The timing and the frequency of the alternating magnetic field generated by the electromagnet 60 are controlled by the external circuit described above.

As illustrated in FIGS. 3, 7A, and 7B, the permanent magnet 70 is a plate-like magnet being generally a rectangular parallelepiped. The two permanent magnets 70 are arranged on the front edge side and on the rear edge side of the housing 10, respectively, so as to be positioned on an extended line in the front-back direction of the magnetic core 61 included in the electromagnet 60 of the vibrator 20 (refer to as the extended line in the front-back direction of the vibrator 20, hereafter). Also, as illustrated in FIGS. 7A and 7B, the permanent magnet 70 has a magnetized face 71 that is formed to have generally a rectangular shape, and edges along the left-right direction and along the up-down direction. Further, the magnetized face 71 of the permanent magnet 70 is opposite to the magnetic core 61 of the electromagnet 60 in in the frond-back direction.

Also, the permanent magnet 70 has a slit 72 that is formed to extend diagonally from the upper left to the lower right of the magnetized face 71. Further, the magnetized face 71 is partitioned into two magnetized regions 73 by the slit 72, and the two magnetized regions 73 are magnetized to be magnetic poles different from each other. In this way, the permanent magnet 70 is magnetized to have different magnetic poles aligned along the left-right direction and along the up-down direction, respectively.

In the following, the permanent magnet 70 arranged on the front edge side of the housing 10 will be referred to as the permanent magnet 70 on the front side; and the permanent magnet 70 arranged on the rear edge side of the housing 10 will be referred to as the permanent magnet 70 on the rear side. Also, among the two magnetized regions 73, a region on the lower left side will be referred to as the first magnetized region 73*a*; and a region on the upper right side will be referred to as the second magnetized region 73*b*. Further, it is assumed in the following description that in the permanent magnet 70 on the front side, the first magnetized region 73*a* becomes an S pole and the second magnetized region 73*b* becomes an N pole; and in the permanent magnet 70 on the rear side, the first magnetized region 73*a* becomes an N pole and the second magnetized region 73*b* becomes an S pole.

Also, a yoke 74 as a member made of a ferromagnetic material is attached to the permanent magnet 70, for directing the magnetic field generated by the permanent magnet 70 toward the electromagnet 60. The vibration providing part 1 has a configuration like this.

Next, operations of the vibration providing part 1 will be described by using FIGS. 8A, 8B, 9A, and 9B. As described earlier, the magnetic drive part 50 includes the electromagnet 60 arranged facing the vibrator 20, and the two permanent magnets 70 arranged facing the housing 10. Further, the electromagnet 60 generates an alternating magnetic field by causing an alternating current to flow through the coil 63, to magnetize the front edge 61F and the rear edge 61R of the core 61. Also, the permanent magnet 70 is arranged on the housing 10 side so to be opposite the electromagnet 60 in front and in the rear. Further, on the magnetized surface 71 of the permanent magnet 70, the first magnetized region 73*a* and the second magnetized region 73*b* that are magnetized to be different magnetic poles.

Further, as illustrated in FIG. 8A, when the front edge 61F of the core 61 is magnetized to be an N pole, the front edge 61F of the core 61 attracts the first magnetized region 73*a* of the permanent magnet 70 on the front side to each other, and repels the second magnetized region 73*b* from each other. Although not illustrated, when the front edge 61F of the core 61 is magnetized to be an N pole, the rear edge 61R of the core 61 is magnetized to be an S pole; and the rear edge 61R of the core 61 attracts the first magnetized region 73*a* of the permanent magnet 70 on the rear side to each other, and repels the second magnetized region 73*b* from each other. As a result, the magnetic forces act on the vibrator 20 in the left direction and in the downward direction.

Also, as illustrated in FIG. 8B, when the front edge 61F of the core 61 is magnetized to be an S pole, the front edge 61F of the core 61 repels the first magnetized region 73*a* of the permanent magnet 70 on the front side from each other, and attracts the second magnetized region 73*b* to each other. Although not illustrated, when the front edge 61F of the core 61 is magnetized to be an S pole, the rear edge 61R of the core 61 is magnetized to be an N pole; and the rear edge 61R of the magnetic core 61 repels the first magnetized region 73*a* of the permanent magnet 70 on the rear side from each other, and attracts the second magnetized region 73*b* to each other. As a result, the magnetic forces act on the vibrator 20 in the right direction and in the UP direction.

In this way, in the magnetic drive part 50, every time the direction of the magnetic field generated by the electromagnet 60 is inverted, the front edge 61F and the rear edge 61R of the magnetic core 61 of the electromagnet 60 attract or repel the first magnetized region 73*a* of the permanent magnet 70 to or from each other, and repel or attract the second magnetized region 73*b* from or to each other. Further, the magnetic drive part 50 uses the magnetic forces between the electromagnet 60 and the permanent magnet 70, to drive the vibrator 20 in the left-right direction and in the up-down direction.

On the other hand, as described earlier, the vibrator 20 is supported by the elastic supporter 40, to be capable of vibrating along the left-right direction and along the up-down direction. Further, the vibrator 20 vibrates along the left-right direction at the first natural frequency that is determined according to the first modulus of elasticity and the mass of the vibrator 20, and vibrates along the up-down direction at the second natural frequency that is determined according to the second modulus of elasticity and the mass of the vibrator 20.

Therefore, as illustrated in FIG. 9A, when the electromagnet 60 generates an alternating magnetic field at the same frequency as the first natural frequency, for the vibrator 20, it becomes easier to vibrate in the left-right direction, and harder to vibrate in the up-down direction. As a result, the vibrator 20 starts vibrating along the left-right direction. Also, as illustrated in FIG. 9B, when the electromagnet 60 generates an alternating magnetic field at the same frequency as the second natural frequency, for the vibrator 20, it becomes easier to vibrate in the up-down direction, and harder to vibrate in the left-right direction. As a result, the vibrator 20 starts vibrating along the up-down direction.

By using such a relationship between the frequency of the alternating magnetic field and the easiness of vibration of the vibrator 20, the magnetic drive part 50 vibrates the vibrator 20 along the left-right direction by the alternating magnetic field at the same frequency as the first natural frequency, and vibrates the vibrator 20 along the up-down direction by the alternating magnetic field at the same frequency as the second natural frequency. In the following, vibrating the vibrator 20 along the left-right direction by the alternating magnetic field at the same frequency as the first natural frequency, will be referred as to driving the vibrator 20 in the left-right direction at the first natural frequency; and vibrating the vibrator 20 along the up-down direction by the alternating magnetic field at the same frequency as the second natural frequency, will be referred as to driving the vibrator 20 in the up-down direction at the second natural frequency.

Next, a method of stabilizing vibrating operations of the vibrator 20 will be described. As described earlier, a plate spring having such a folded structure like the elastic supporter 40, has a feature in that elastic deformation occurs easier in a direction orthogonal to the folds, whereas deformation hardly occurs in the direction along the folds. Therefore, in the vibration providing part 1, by using the feature of the plate spring, deformation of the elastic supporter 40 along the front-back direction is suppressed; and thereby, movement of the vibrator 20 along the front-back direction is suppressed, and vibrating operations of the vibrator 20 along the left-right direction and along the up-down direction are stabilized.

Moreover, in the plate spring having such a folded structure, a width dimension of the flat part 42 greater than the length dimension of the flat part 42 makes deformation along the folds more difficult. In the vibration providing part 1, by using the feature of the plate spring having such a folded structure, the elastic supporter 40 is formed so as to have the width dimension of the flat part 42 greater than the length dimension of the flat part 42, and thereby, deformation of the elastic supporter 40 along the front-back direction can be suppressed more easily.

Also, in the plate spring having such a folded structure, although the outer periphery of the flat part 42 greatly influences the difficulty of deformation of the elastic supporter 40 along the folds, the influence of part of the flat part 42 away from the outer periphery (part closer to the center) is smaller than the influence of the outer periphery of the flat part 42. On the other hand, by foaming the opening 42*a* at a part away from the outer periphery of the flat part 42, the mechanical strength in directions orthogonal to the folds of the flat part 42 (in the left-right direction and in the up-down direction) can be reduced, and thereby, the elastic supporter 40 can be made elastically deformable more easily in the directions orthogonal to the folds.

By using the feature of the plate spring having such a folded structure, the vibration providing part 1 according to the first example is configured to have the opening 42*a* famed at a position away from the outer periphery of the flat part 42, so as to have elastic deformation occur easier along the left-right direction and along the up-down direction, while the deformability of the elastic supporter 40 along the front-back direction is suppressed. Further, by adjusting the dimensions of the opening 42*a*, the elastic deformability of the elastic supporter 40 along the left-right direction and along the up-down direction can be adjusted.

Next, effects of the vibration providing part 1 will be described. In the vibration providing part 1, the elastic supporter 40 is a plate spring formed to have the multiple folded parts 41 in which the folds are folded along the front-back direction (third direction) orthogonal to the left-right direction (first direction) and to the up-down direction (second direction), and the two flat parts 42 that have generally a rectangular shape and extend from one of the multiple folded parts 41 to another. A plate spring having such a folded structure, has a feature in that elastic deformation occurs easier in a direction orthogonal to the folds, whereas deformation hardly occurs in the direction along the folds. Therefore, elastic deformation of the elastic supporter 40 along the left-right direction and along the up-down direction can occur easily, and deformability of the elastic supporter 40 along the front-back direction can be suppressed. As a result, even when a force along the front-back direction acts on the vibrator 20 by a magnetic force between the electromagnet 60 (the first magnetic field generating part) and the permanent magnet 70 (the second magnetic field generating part), movement of the vibrator 20 along the front-back direction can be suppressed, and vibrating operations along the left-right direction and along the up-down direction of the vibrator 20 can be stabilized.

Also, in the vibration providing part 1, by foaming the opening 42*a* at a position away from the outer periphery of the flat part 42, while suppressing the deformability of the elastic supporter 40 along the front-back direction, elastic deformation can occur easier along the left-right direction and along the up-down direction. Further, by adjusting the dimensions of the opening 42*a*, the elastic deformability of the elastic supporter 40 along the left-right direction and along the up-down direction can be adjusted. As a result, while stabilizing the vibrating operations of the vibrator 20, the vibrator 20 can be easily vibrated along the left-right direction and along the up-down direction, and the easiness of vibration of the vibrator 20 can be adjusted.

Also, in the vibration providing part 1, by forming the elastic supporter 40 so as to have the width dimension of the flat part 42 (the dimension in the direction along the folds) greater than the length dimension of the flat part 42 (the dimension along the extending direction), the deformation of the elastic supporter 40 along the front-back direction can be further suppressed, and the vibrating operations of the vibrator 20 can be further stabilized.

Also, in the vibration providing part 1, the magnetic drive part 50 driving the vibrator 20 at the first natural frequency corresponding to the first modulus of elasticity and the mass of the vibrator 20, makes the vibrator 20 easily vibrated along the left-right direction, and hardly vibrated along the up-down direction. Also, the magnetic drive part 50 driving the vibrator 20 at the second natural frequency corresponding to the second modulus of elasticity and the mass of the vibrator 20, makes the vibrator 20 easily vibrated along the up-down direction, and hardly vibrated along the left-right direction. As a result, while stabilizing the vibrating operations of the vibrator 20, desired vibrating operations of the vibrator 20 along the left-right direction and along the up-down direction can be implemented.

Also, in the vibration providing part 1, by the alternating magnetic field generated by the electromagnet 60, the magnetic core 61 on the electromagnet 60 side can be attracted to or repelled from the first magnetized region 73*a* as one of the magnetic poles on the permanent magnet 70 side, and the core 61 can be repelled from or attracted to the second magnetized region 73*b* as the other pole on the permanent magnet 70 side. Further, by using the magnetic forces between the electromagnet 60 and the permanent magnets 70, the vibrator 20 can be easily vibrated along the left-right direction and along the up-down direction. Moreover, even when the magnetic forces act between the permanent magnets 70 and the electromagnet 60, deformation of the elastic supporter 40 along the front-back direction is suppressed; therefore, the vibrating operations of the vibrator 20 can be stabilized. Therefore, such a vibration providing part 1 is suitable in the case of driving the vibrator 20 by using the magnetic forces between the electromagnet 60 and the permanent magnets 70.

Such a vibration providing part 1 can be used, for example, by attaching the lower end of the main body 11 or the cover 12 to the bottom plate 211 of the housing 260.

As long as the predetermined functions can be implemented, the configuration of the vibration providing part 1 may be changed appropriately. For example, two elastic supporters 40 may be attached directly to the vibrator 20. In this case, the holder 30 becomes unnecessary. Also, the vibration providing part 1 may further include members other than those described above.

Also, as long as the predetermined functions can be implemented, the materials and/or the shapes of the housing 10, the holder 30, and the elastic supporter 40 may be changed appropriately. For example, the number of folds of the plate spring as the elastic supporter 40 may be a number other than that described above. Also, the shape of the flat part 42 and/or the shape of the opening **42*a* may be shapes other than those described above. Also, the elastic supporter 40 may be formed using a separate member from the holder 30, and then, combined with the holder 30**.

Also, as long as the predetermined functions can be implemented, the configuration of the magnetic drive part 50 may be changed appropriately. For example, the permanent magnet 70 may be arranged on either one of the front edge side or the rear edge side of the housing 10. Also, as long as different magnetic poles are arranged along the left-right direction and along the up-down direction, respectively, the shape of the slit 72 may be other than that described above. Also, multiple permanent magnets magnetized to be different magnetic poles along the left-right direction and along the up-down direction may be arranged in the housing 10.

Also, as long as the predetermined functions can be implemented, the magnetic drive part 50 may drive the vibrator 20 at a vibration frequency other than the first natural frequency and the second natural frequency. For example, the magnetic drive part 50 not only drives the vibrator 20 along the left-right direction at the first natural frequency and drives the vibrator 20 along the up-down direction at the second natural frequency, but also may drive the vibrator 20 in an oblique direction at an intermediate vibration frequency between the first natural frequency and the second natural frequency.

Figure 10:
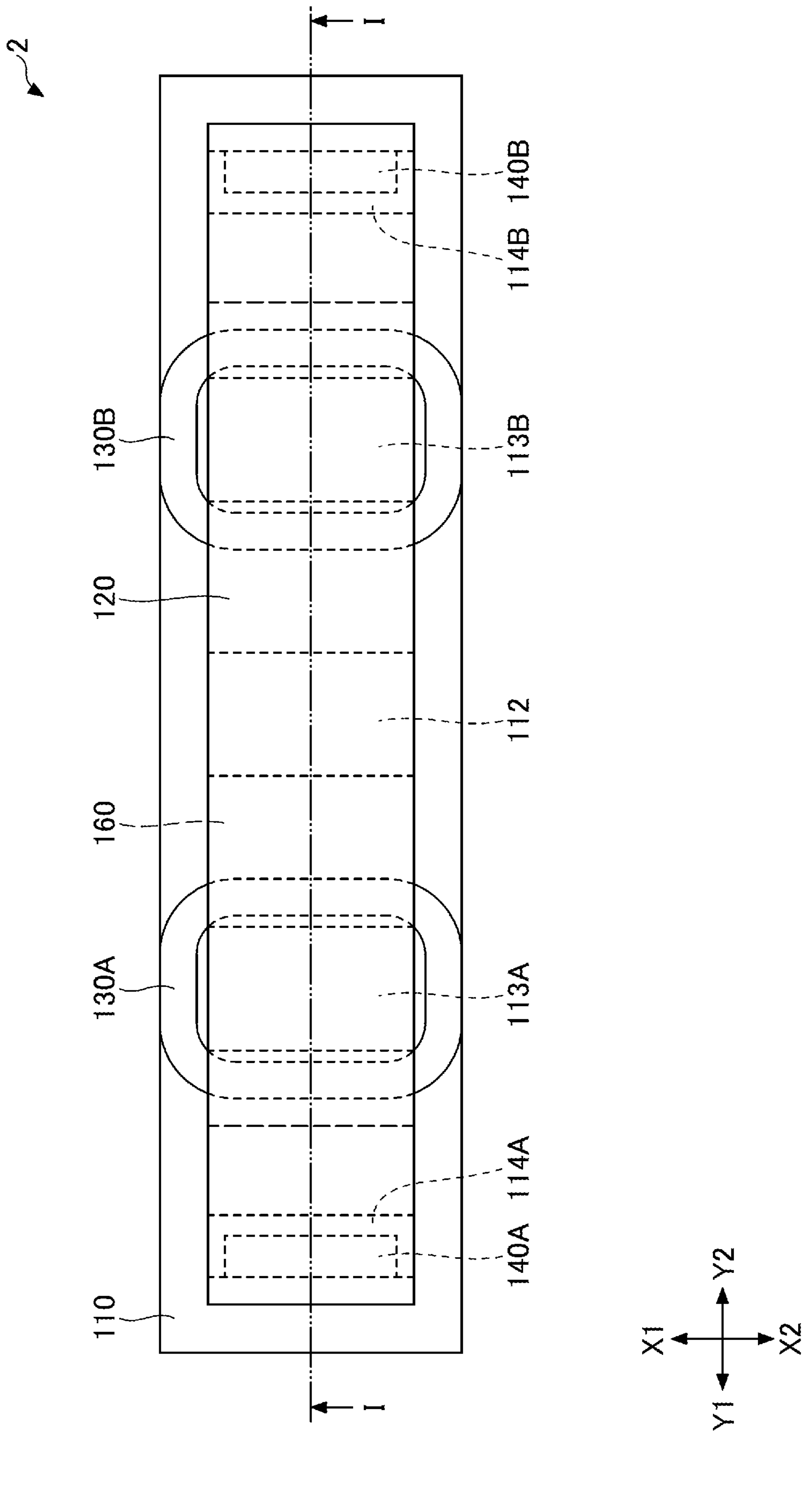
FIG. 10 is a plan view illustrating a configuration of the second example of the vibration providing part.
Figure 11:
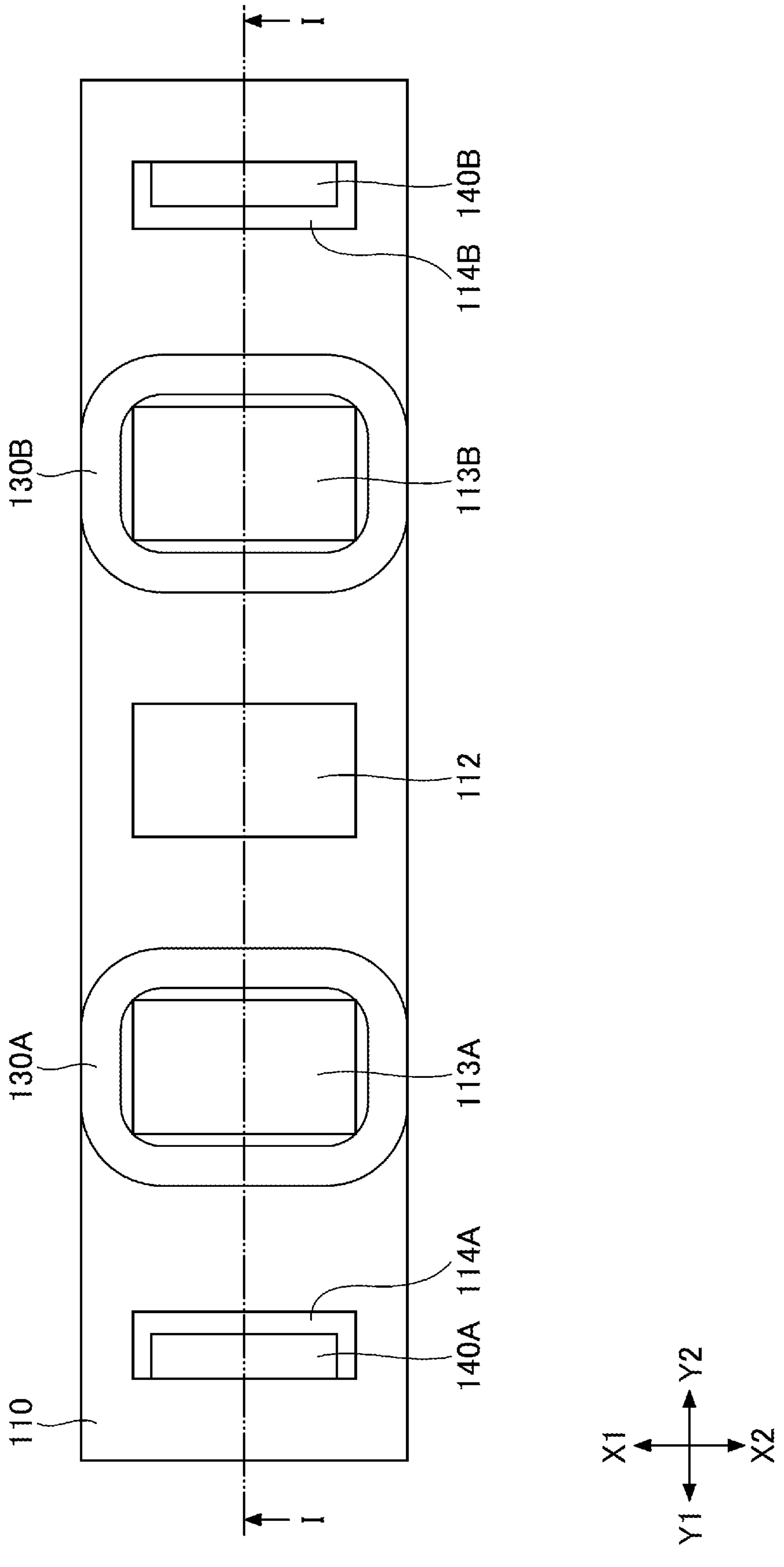
FIG. 11 is a plan view in which a movable yoke and a permanent magnet in FIG. 10 are excluded.
Figure 12:
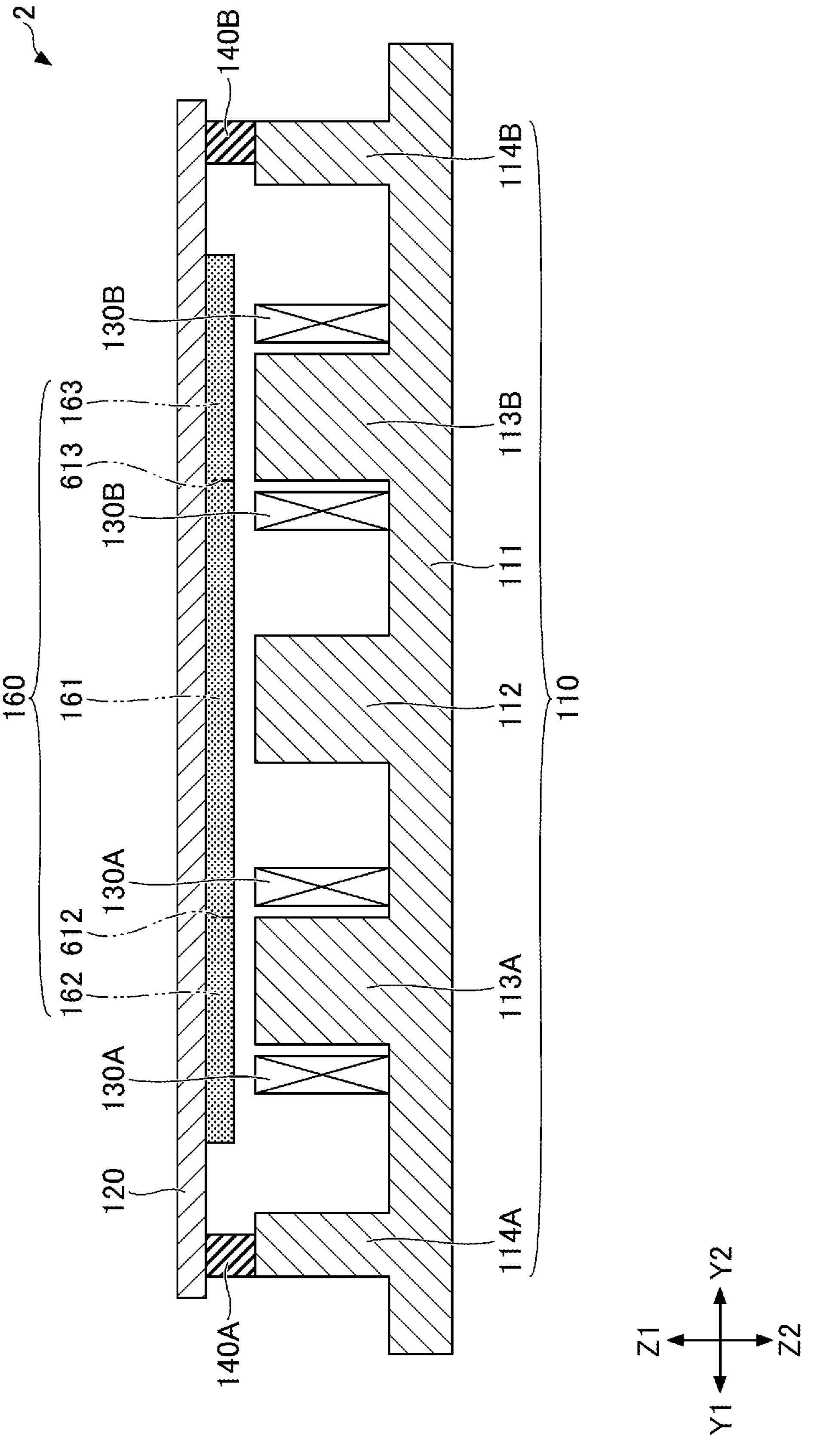
FIG. 12 is a cross-sectional view illustrating a configuration of the first example of the vibration providing part.

Next, a vibration providing part 2 according to a second example of the vibration providing part 220 will be described. FIG. 10 is a plan view illustrating a configuration of the vibration providing part 2; FIG. 11 is a plan view in which the movable yoke and the permanent magnet are removed from FIG. 10; and FIG. 12 is a cross-sectional view illustrating the configuration of the vibration providing part 2. FIG. 6 corresponds to a cross sectional view along a line I-I in FIGS. 4 and 5.

In the vibration providing part 2 according to the second example, the Z1-Z2 direction is an example of a first direction; and the Y1-Y2 direction is an example of a second direction.

As illustrated in FIGS. 10 to 12, the vibration providing part 2 includes a fixed yoke 110, a movable yoke 120, a first excitation coil 130A, a second excitation coil 130B, a first rubber 140A, a second rubber 140B, and a permanent magnet 160. The fixed yoke 110 has a plate-shaped base 111 having a generally rectangular planar shape. The axial core direction of the first excitation coil 130A and the second excitation coil 130B is parallel to the Z1-Z2 direction. The movable yoke 120 is an example of a first yoke, the fixed yoke 110 is an example of a second yoke, and the first rubber 140A and the second rubber 140B are examples of elastic support members.

The fixed yoke 110 further includes a central protruding part 112 protruding upward (on the Z1 side) from the center of the base 111; a first side protruding part 114A protruding upward from an edge (front edge) of the base 111 on the Y1 side in the longitudinal direction; and a second side protruding part 114B protruding upward from an edge (rear edge) of the base 111 on the Y2 side in the longitudinal direction. The first side protruding part 114A and the second side protruding part 114B are arranged at positions between which the central protruding parts 112 is interposed in the X1-X2 direction. The fixed yoke 110 further includes a first iron core 113A protruding upward from the base 111, between the central protruding part 112 and the first side protruding part 114A; and a second iron core 113B protruding upward from the base 111, between the central protruding part 112 and the second side protruding part 114B. The first excitation coil 130A is wound around the first iron core 113A, and the second excitation coil 130B is wound around the second iron core 113B. The first rubber 140A is arranged on the first side protruding part 114A, and the second rubber 140B is arranged on the second side protruding part 114B. The central protruding part 112 is an example of a first protruding part, and the first side protruding part 114A and the second side protruding part 114B are examples of second protruding parts.

The movable yoke 120 is plate-shaped, and has a generally rectangular planar shape. The movable yoke 120 contacts the first rubber 140A and the second rubber 140B at its edges in the longitudinal direction. The permanent magnet 160 is attached to a surface of the movable yoke 120 on the fixed yoke 110 side. The permanent magnet 160 includes a first region 161, a second region 162 positioned on the Y1 side of the first region 161, and a third region 163 positioned on the Y2 side of the first region 161. For example, the first region 161 is magnetized to be an S pole, and the second and third regions 162 and 163 are magnetized to be N poles. Furthermore, the permanent magnet 160 is attached to the movable yoke 120 at substantially the center in plan view, so that the first region 161 is opposite to the central protruding part 112; a boundary 612 between the first region 161 and the second region 162 is opposite to the first excitation coil 130A; and a boundary 613 between the first region 161 and the third region 163 is opposite to the second excitation coil 130B. Also, the boundary 612 is positioned on the Y2 side relative to the axial core of the first excitation coil 130A, and the boundary 613 is positioned on the Y1 side relative to the axial core of the second excitation coil 130B. In other words, the boundary 612 is positioned on the Y2 side relative to the center of first iron core 113A, and the boundary 613 is positioned on the Y1 side relative to the center of second iron core 113B. The permanent magnet 160 magnetizes the fixed yoke 110 and the movable yoke 120, and the magnetic attractive force biases the movable yoke 120 in the Z1-Z2 direction toward the fixed yoke 110. Also, the magnetic attractive force biases both ends of the movable yoke 120 in the Y1-Y2 direction to approach the first side protruding part 114A and the second side protruding part 114B, respectively.

When vibration is generated in the housing 260, the vibration providing part 2 is driven so that the directions of respective currents flowing in the first excitation coil 130A and the second excitation coil 130B are inverted alternately. In other words, by alternately inverting the direction of the current flowing in each of the first excitation coil 130A and the second excitation coil 130B, the pole on a surface of the first iron core 113A facing the movable yoke 120 and the pole on a surface of the second iron core 113B facing the movable yoke 120 are to alternately inverted independently from each other. As a result, according to the direction of a current flowing through the first excitation coil 130A, and the direction of a current flowing through the second excitation coil 130B, the permanent magnet 160 and the movable yoke 120 reciprocate in the Y1-Y2 direction or the Z1-Z2 direction. A relationship between directions of currents and directions of motions will be described later.

For example, the first rubber 140A and the second rubber 140B have a rectangular planar shape whose longitudinal direction corresponds to the X1-X2 direction. The first rubber 140A is interposed between the first side protruding part 114A and the movable yoke 120, and the second rubber 140B is interposed between the second side protruding part 114B and the movable yoke 120. In other words, the first rubber 140A and the second rubber 140B are interposed between the fixed yoke 110 and the movable yoke 120. Therefore, unless intentionally disassembled, the first rubber 140A and the second rubber 140B are held between the fixed yoke 110 and the movable yoke 120. Note that the first rubber 140A may be fixed to the top surface of the first side protruding part 114A, fixed to the bottom surface of the movable yoke 120, or fixed to the both; and the second rubber 140B may be fixed to the upper surface of the second side protruding part 114B, fixed to the bottom surface of the movable yoke 120, or fixed to the both.

Here, a relationship between directions of currents and directions of motions will be described. In total, there are four types of combinations in terms of the direction of a current flowing through the first excitation coil 130A, and the direction of a current flowing through the second excitation coil 130B.

Figure 13A:
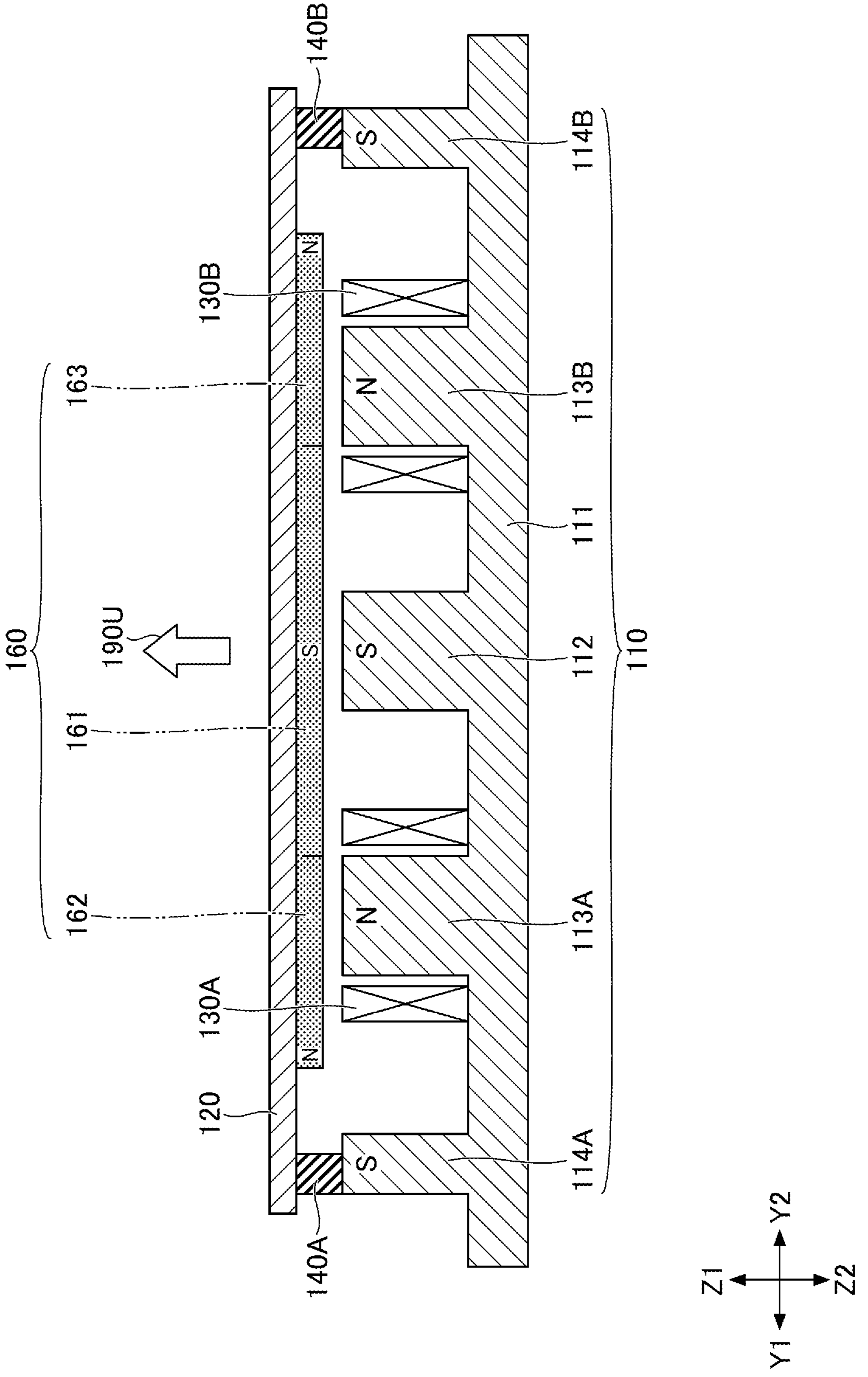
FIG. 13A is a diagram illustrating a relationship between directions of currents and directions of motions in a first combination.

In the first combination, when viewed from the Z1 side, currents flow through the first excitation coil 130A and the second excitation coil 130B counter-clockwise. FIG. 13A is a diagram illustrating a relationship between the directions of the currents and the directions of motions in the first combination. In the first combination, as illustrated in FIG. 13A, the magnetic pole of the first iron core 113A facing the movable yoke 120 becomes an N pole, the magnetic pole of the second iron core 113B facing the movable yoke 120 also becomes an N pole. On the other hand, the poles of the central protruding part 112, the first side protruding part 114A, and the second side protruding part 114B on the surfaces facing the movable yoke 120 become S poles. As a result, a repulsive force acts between the central protruding part 112 and the first region 161, a repulsive force acts between the first iron core 113A and the second region 162, and a repulsive force acts between the second iron core 113B and the third region 163. Therefore, a force 190U directed toward the Z1 side acts on the movable yoke 120.

Figure 13B:
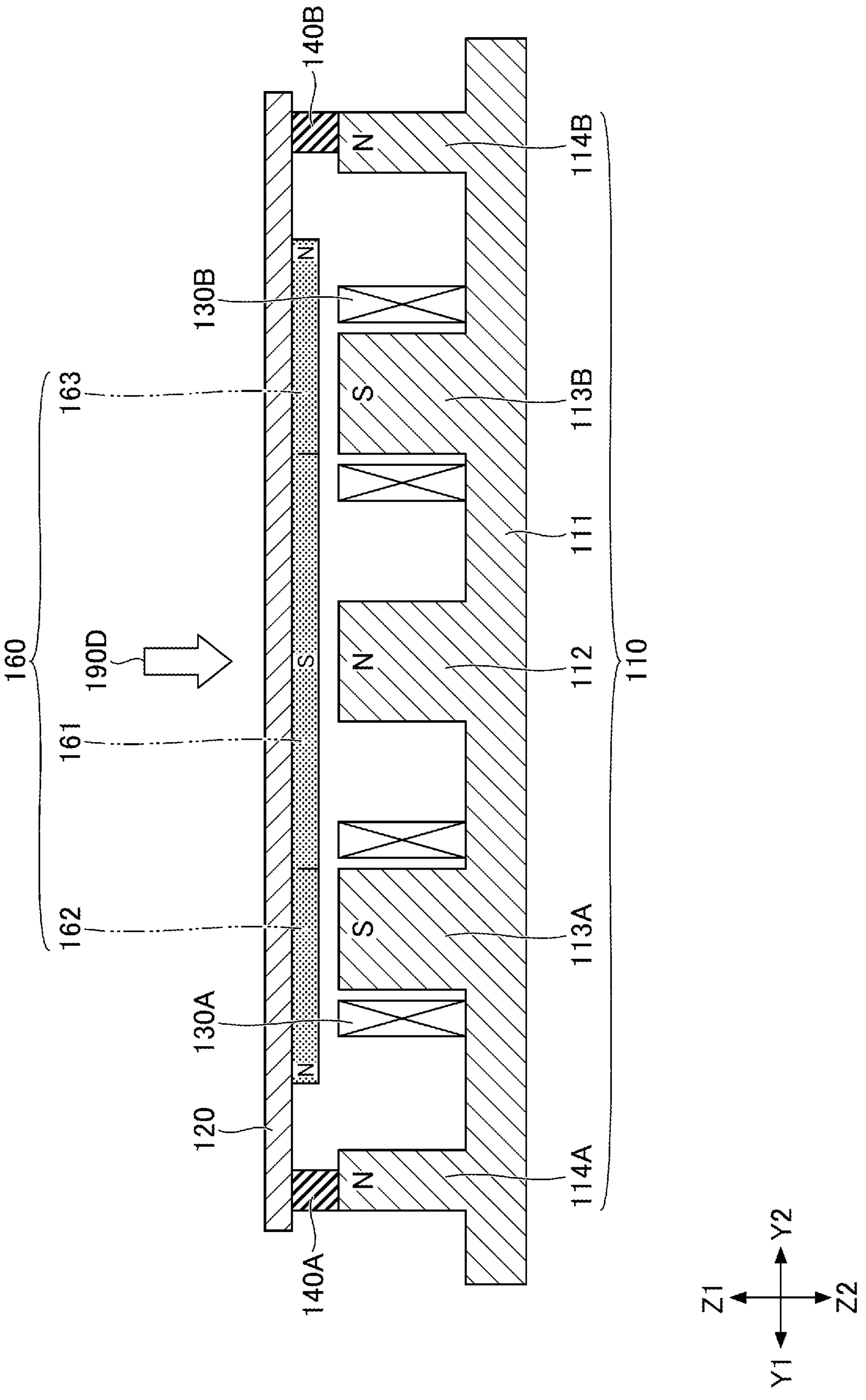
FIG. 13B is a diagram illustrating a relationship between directions of currents and directions of motions in a second combination.

In the second combination, when viewed from the Z1 side, currents flow through the first excitation coil 130A and the second excitation coil 130B clockwise. FIG. 13B is a diagram illustrating a relationship between the directions of the currents and the directions of motions in the second combination. In the second combination, as illustrated in FIG. 13B, the magnetic pole of the first iron core 113A facing the movable yoke 120 becomes an S pole, the magnetic pole of the second iron core 113B facing the movable yoke 120 also becomes an S pole. On the other hand, the poles of the central protruding part 112, the first side protruding part 114A, and the second side protruding part 114B on the surfaces facing the movable yoke 120 become N poles. As a result, an attractive force acts between the central protruding part 112 and the first region 161; an attractive force acts between the first iron core 113A and the second region 162; and an attractive force acts between the second iron core 113B and the third region 163. Therefore, a force 190D directed toward the Z2 side acts on the movable yoke 120.

Therefore, by repeating the first combination and the second combination so that currents flows through the first excitation coil 130A and the second excitation coil 130B in the same direction, the movable yoke 120 reciprocates in the Z1-Z2 direction. In other words, by energizing the first excitation coil 130A and the second excitation coil 130B, the movable yoke 120 vibrates in the Z1-Z2 direction with the neutral position being the position in the initial state.

Figure 13C:
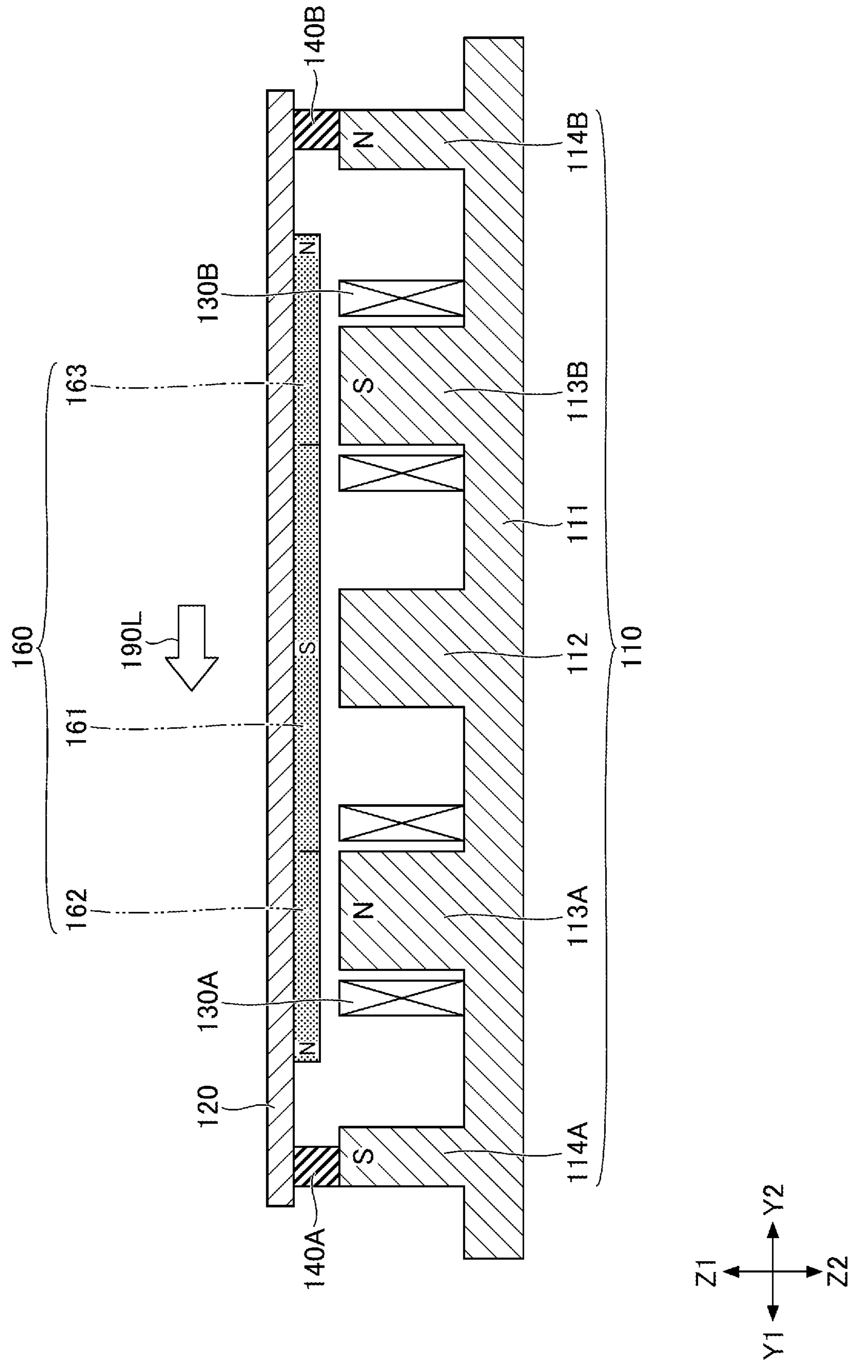
FIG. 13C is a diagram illustrating a relationship between directions of currents and directions of motions in a third combination.

In the third combination, when viewed from the Z1 side, a current flows through the first excitation coil 130A counter-clockwise, and a current flows through the second excitation coil 130B clockwise. FIG. 13C is a diagram illustrating a relationship between the directions of the currents and the directions of motions in the third combination. In the third combination, as illustrated in FIG. 13C, the magnetic pole of the first iron core 113A facing the movable yoke 120 becomes an N pole, and the magnetic pole of the second iron core 113B facing the movable yoke 120 becomes an S pole. Also, the magnetic pole of the first side protruding part 114A facing the movable yoke 120 becomes an S pole, and the magnetic pole of the second side protruding part 114B facing the movable yoke 120 becomes an N pole. As a result, an attractive force acts between the first side protruding part 114A and the second region 162; an attractive force acts between the first iron core 113A and the first region 161; a repulsive force acts between the second iron core 113B and the first region 161; and a repulsive force acts between the second side protruding part 114B and the third region 163. Therefore, a force 190L directed toward the Y1 side acts on the movable yoke 120.

Figure 13D:
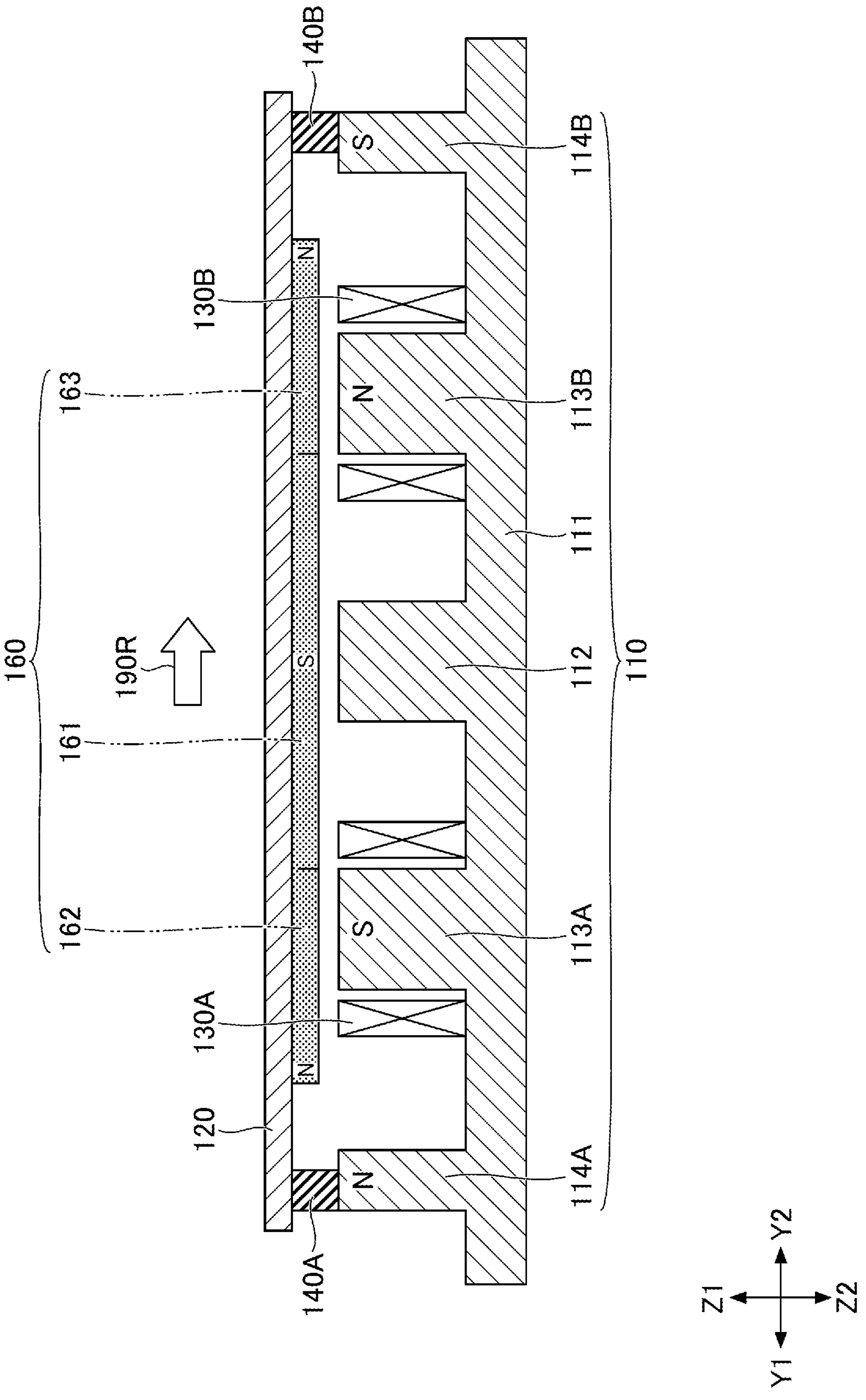
FIG. 13D is a diagram illustrating a relationship between directions of currents and directions of motions in a 4th combination.

In the fourth combination, when viewed from the Z1 side, a current flows through the first excitation coil 130A clockwise, and a current flows through the second excitation coil 130B counter-clockwise. FIG. 13D is a diagram illustrating a relationship between the directions of the currents and the directions of motions in the fourth combination. In the fourth combination, as illustrated in FIG. 13D, the magnetic pole of the first iron core 113A facing the movable yoke 120 becomes an N pole, and the magnetic pole of the second iron core 113B facing the movable yoke 120 becomes an S pole. Also, the magnetic pole of the first side protruding part 114A facing the movable yoke 120 becomes an S pole, and the magnetic pole of the second side protruding part 114B facing the movable yoke 120 becomes an N pole. As a result, a repulsive force acts between the first side protruding part 114A and the second region 162; a repulsive force acts between the first iron core 113A and the first region 161; an attractive force acts between the second iron core 113B and the first region 161; and an attractive force acts between the second side protruding part 114B and the third region 163. Therefore, a force 190R directed toward the Y2 side acts on the movable yoke 120.

Therefore, by repeating the third combination and the fourth combination so that currents flows through the first excitation coil 130A and the second excitation coil 130B in the opposite directions, the movable yoke 120 reciprocates in the Y1-Y2 direction. In other words, by energizing the first excitation coil 130A and the second excitation coil 130B, the movable yoke 120 vibrates in the Y1-Y2 direction with the neutral position being the position in the initial state.

Such a vibration providing part 2 can be used, for example, by attaching a surface of the movable yoke 120 on the Z1 side to the bottom plate 211 of the housing 260.

Second Embodiment

Figure 14:
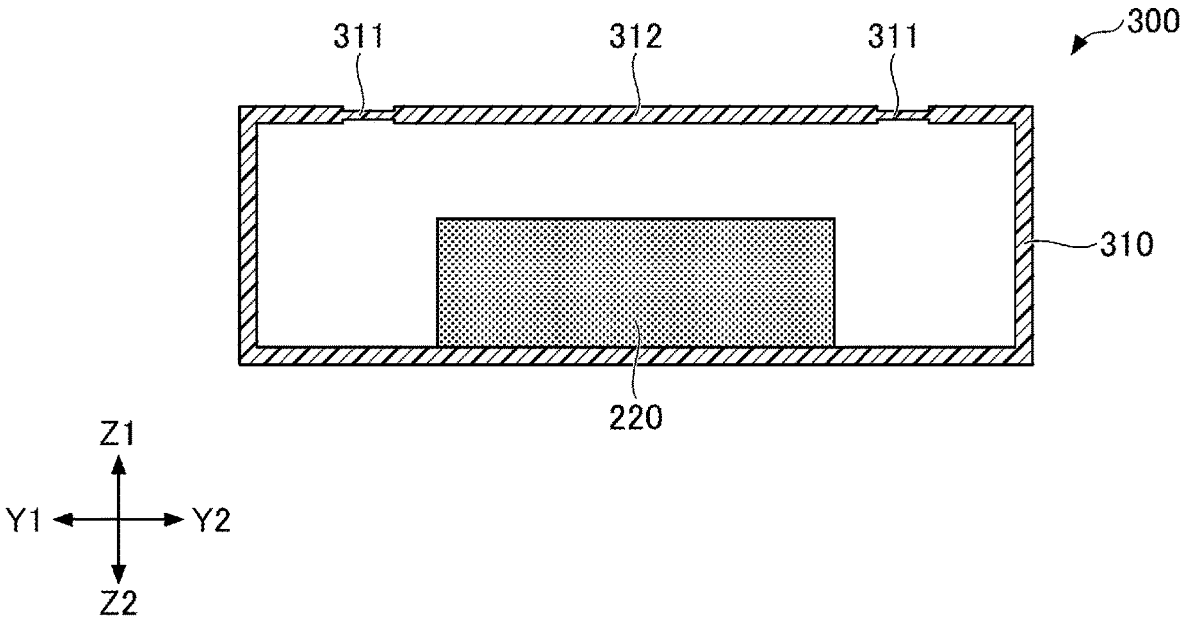
FIG. 14 is a diagram illustrating a configuration of a vibration generating device according to a second embodiment.

Next, a second embodiment will be described. The second embodiment differs from the first embodiment in tams of the relationship between the housing and the diaphragm. FIG. 14 is a cross-sectional view illustrating a configuration of a vibration generating device according to the second embodiment.

As illustrated in FIG. 14, a vibration generating device 300 according to the second embodiment includes a housing 310; a diaphragm 312 that is supported by the housing 310 and generates sound by vibrating in the first direction (the Z1-Z2 direction); and a vibration providing part 220 that is attached to the housing 310 to vibrate the housing 310. The vibration providing part 220 vibrates the housing 310 in the first direction at a first frequency f1, and vibrates the housing 310 in a second direction orthogonal to the first direction (the X1-X2 direction or the Y1-Y2 direction), at a second frequency f2 that is lower than the first frequency f1. The vibration generating device 300 further includes a coupling part 311 that couples the housing 310 with the diaphragm 312. The coupling part 311 is thinner than part of the housing 310 connected with the coupling part 311. The other elements are substantially the same as those in the first embodiment.

In the vibration generating device 300, the housing 310 vibrating in the first direction causes the diaphragm 312 to vibrate in the first direction through the deflection of the coupling part 311, and the diaphragm 312 vibrating the surrounding air generates sound. Also, when vibrating in the second direction, the diaphragm 312 hardly vibrates in the first direction, and hence, the diaphragm 312 does not generate sound.

Therefore, as in the first embodiment, by vibration at the first frequency f1 in the first direction, sound can be presented to a person with virtually no vibration felt by the person, and by vibration at the second frequency f2 in the second direction, vibration can be presented to the person with virtually no sound felt by the person.

For example, the diaphragm 312 can be integrally famed with the coupling part 311 and the housing 310. Also, for example, the housing 310, the coupling part 311, and the diaphragm 312 are made of synthetic resin. The diaphragm 312 may be have a thickness equivalent to the thickness of the coupling part 311, or may be thinner or thicker than the coupling part 311.

The application of the vibration generating device in the present disclosure is not limited in particular, and can be used, for example, for presenting vibration and sound to persons who are riding in an automobile. For example, presentation for alerting only the driver to a low-urgency matter can be provided by vibration in the driver's seat, whereas presentation for alerting all occupants in the automobile to a high-urgency matter can be provided by sound spreading throughout the entire interior of the automobile. The location at which the vibration generating device in the present disclosure is installed is not limited in particular, and can be embedded, for example, in the bearing surface or the backrest of the driver's seat.

Also, vibration and sound may be presented from multiple vibration generating devices to a single user. For example, by using multiple vibration generating devices to present the vibration or sound in multiple directions, lively presentation can be provided.

Also, according to the first and second embodiments, although sound and vibration can be adequately separated when being presented to the user, in some applications, sound and vibration may be intentionally mixed when being presented to the user.

Figure 15A:
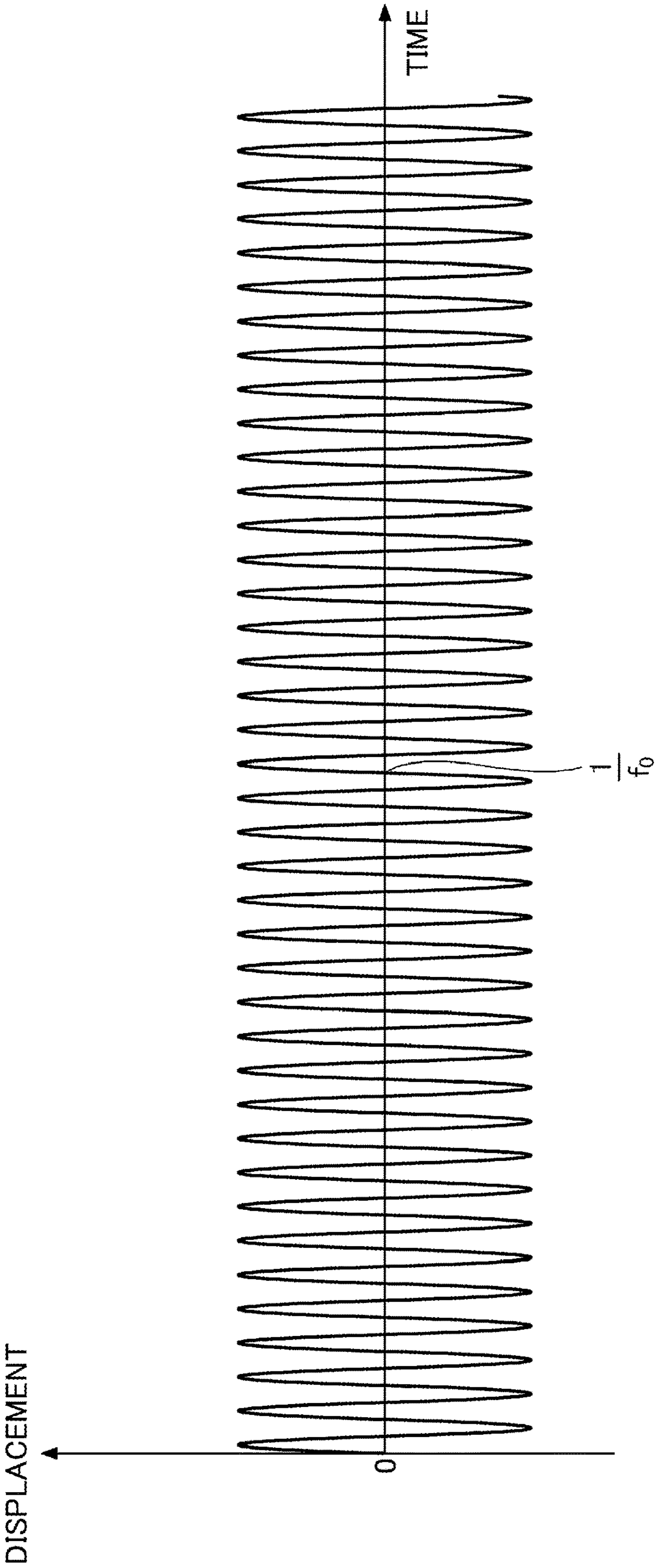
FIG. 15A is a diagram illustrating an example of a waveform of a signal at a first frequency.
Figure 15B:
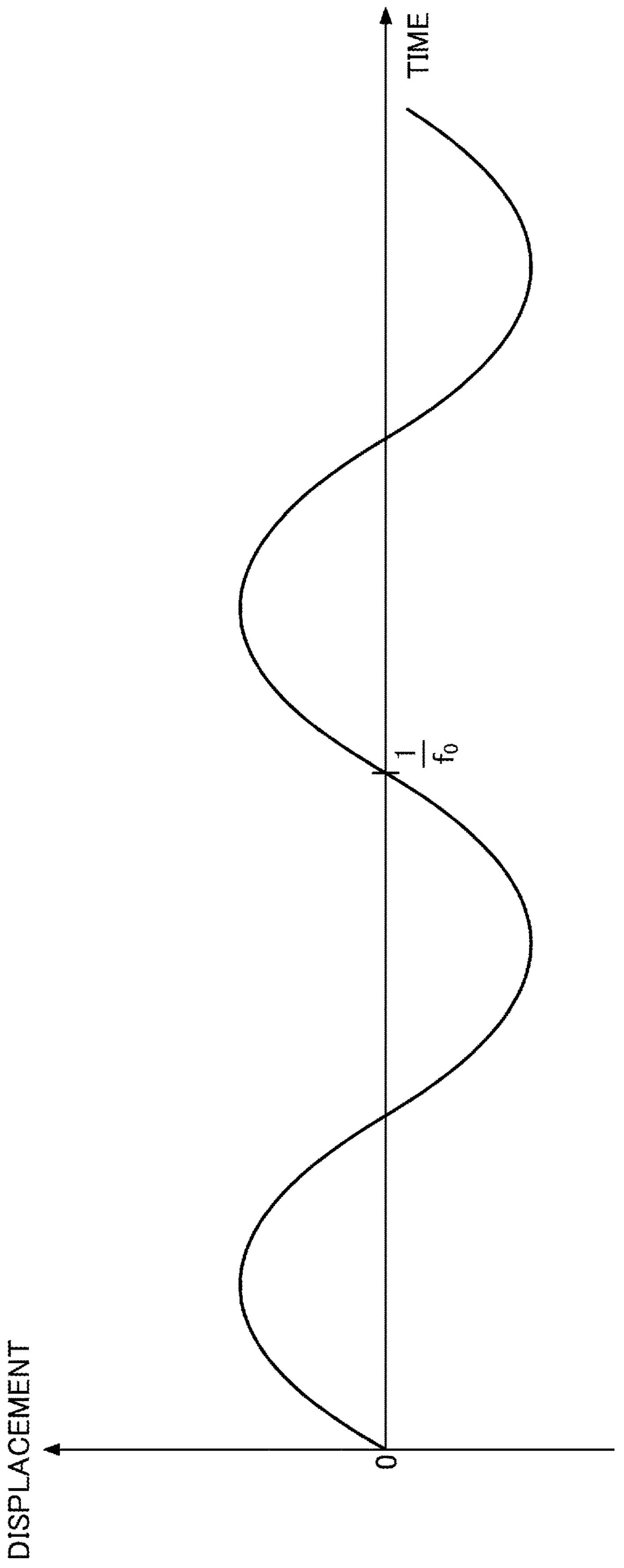
FIG. 15B is a diagram illustrating an example of a waveform of a signal at a second frequency.
Figure 15C:
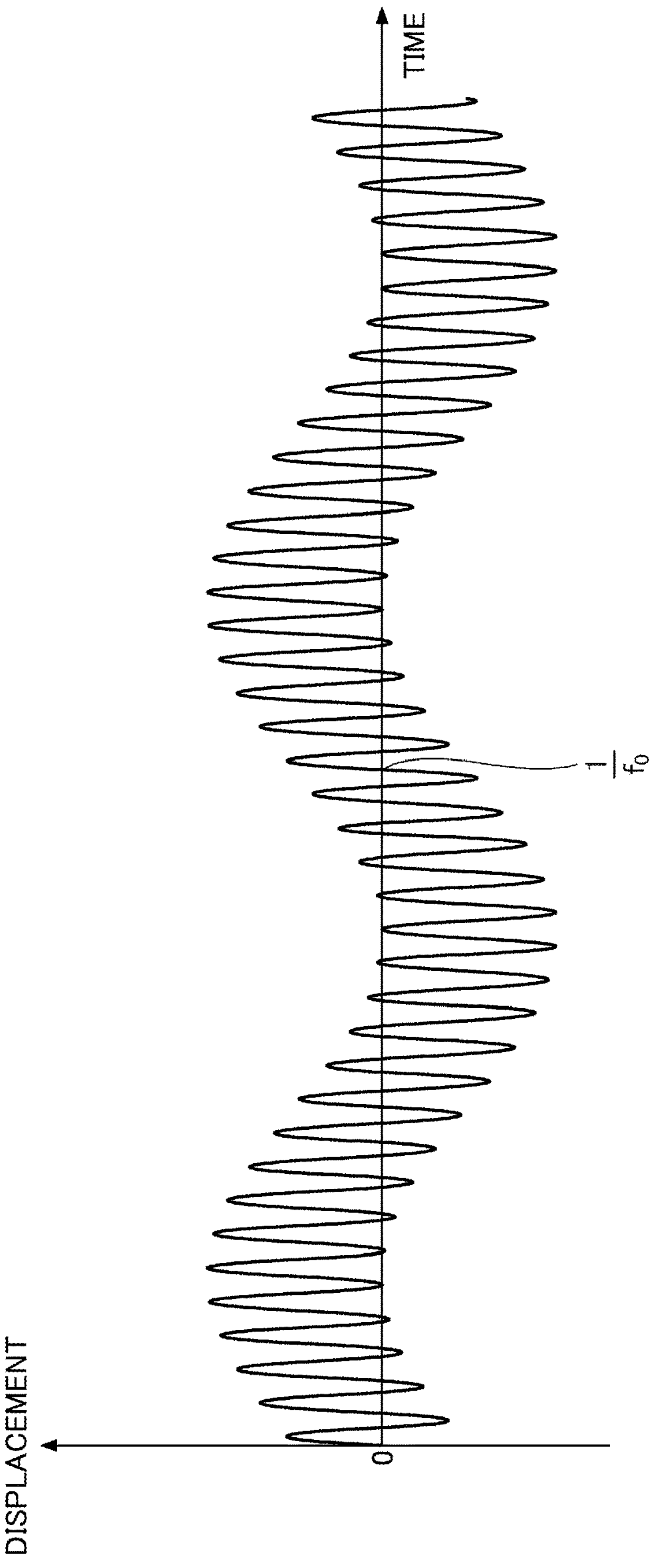
FIG. 15C is a diagram illustrating an example of a waveform of a signal in which a first frequency signal is superimposed with a second frequency signal.

Also, as signals input into the vibration generating device in the present disclosure, a signal at the first frequency f1 (high-frequency signal) and a signal at the second frequency f2 (low-frequency signal) may be input separately, or a signal in which the signal at the first frequency f1 and the signal at the second frequency f2 are superimposed (superimposed signal) may be input. FIG. 15A is a diagram illustrating an example of a waveform of a signal at the first frequency f1. FIG. 15B is a diagram illustrating an example of a waveform of a signal at the second frequency f2. FIG. 15C is a diagram illustrating an example of a waveform of a superimposed signal in which the signal of the first frequency f1 and the signal of the second frequency f2 are superimposed. Here, the first frequency f1 is set to 20×f0 and the second frequency f2 is set to f0. For example, by providing a signal processor in the vibration providing part to separate the superimposed signal illustrated in FIG. 15C into the high-frequency signal illustrated in FIG. 15A and the low-frequency signal illustrated in FIG. 15B, the housing can be vibrated in the first direction at the first frequency f1 and in the second direction at the second frequency f2.

As described above, the favorable embodiments and the like have been described in detail; note that the embodiments and the like can be changed and replaced in various ways without deviating from the scope described in the claims.

What is claimed is:

1. A vibration generating device comprising:
- a housing;
- a diaphragm supported by the housing, and configured to generate sound by vibrating in a first direction; and
- a vibration providing part attached to the housing, and configured to vibrate the housing,
- wherein the vibration providing part vibrates the housing in the first direction at a first frequency, and vibrates the housing in a second direction at a second frequency lower than the first frequency,
- wherein the vibration providing part includes
- an inside housing,
- a vibrator contained in the inside housing,
- an elastic supporter configured to support the vibrator to be capable of vibrating along the first direction and along the second direction, and
- a magnetic drive part configured to drive the vibrator along the first direction and along the second direction by using magnetic forces,
- wherein the magnetic drive part includes
- a first magnetic field generating part arranged on a vibrator side, and
- a second magnetic field generating part arranged on an inside housing side, as to be positioned on an extended line of the vibrator in a third direction orthogonal to the first direction and to the second direction, wherein the elastic supporter is formed with a plate spring that includes a plurality of folded parts each having a fold folded along the third direction, and a flat part extending from one of the folded parts to another of the folded parts.

2. The vibration generating device as claimed in claim 1, wherein a superimposed signal in which a signal at the first frequency and a signal at the second frequency are superimposed, is input, and wherein the vibration providing part separates the superimposed signal into the signal at the first frequency and the signal at the second frequency, to vibrate the housing in the first direction at the first frequency, and vibrate the housing in a second direction at the second frequency.

3. The vibration generating device as claimed in claim 1, wherein the first frequency is greater than or equal to 200 Hz and less than or equal to 6 kHz, and wherein the second frequency is less than or equal to 600 Hz.

4. The vibration generating device as claimed in claim 1, wherein the housing includes a holder configured to hold the diaphragm, and wherein as viewed in the first direction, part of the diaphragm overlapping the holder is fixed to the holder.

5. The vibration generating device as claimed in claim 1, wherein the diaphragm is integrally formed with the housing.

6. The vibration generating device as claimed in claim 1, wherein the housing and the diaphragm are made of synthetic resin or made of metal.

7. A vibration generating device comprising:

a housing;

a diaphragm supported by the housing, and configured to generate sound by vibrating in a first direction; and a vibration providing part attached to the housing, and configured to vibrate the housing, wherein the vibration providing part vibrates the housing in the first direction at a first frequency, and vibrates the housing in a second direction at a second frequency lower than the first frequency, wherein the vibration providing part includes a first yoke, a second yoke arranged to be opposite to the first yoke in the first direction, a permanent magnet attached to a surface of the first yoke facing a second yoke, and a first excitation coil and a second excitation coil attached to the second yoke to generate magnetic flux when being energized, wherein the second yoke includes a base, and a first protruding part protruding from the base toward the first yoke, between the first excitation coil and the second excitation coil, wherein the first excitation coil and the second excitation coil are arranged to have the first protruding part interposed in-between in the second direction, wherein an axial core direction of the first excitation coil and the second excitation coil is parallel to the first direction, wherein the permanent magnet includes a first region, a second region positioned on one side of the first region in the second direction, and a third region positioned on another side of the first region in the second direction, wherein the first region is magnetized to be a first magnetic pole, wherein the second region and the third region are magnetized to be second magnetic poles, wherein the first region is opposite to the first protruding part, wherein a boundary between the first region and the second region is opposite to the first excitation coil, and wherein a boundary between the first region and the third region is opposite to the second excitation coil.

8. The vibration generating device as claimed in claim 7, wherein a superimposed signal in which a signal at the first frequency and a signal at the second frequency are superimposed, is input, and wherein the vibration providing part separates the superimposed signal into the signal at the first frequency and the signal at the second frequency, to vibrate the housing in the first direction at the first frequency, and vibrate the housing in a second direction at the second frequency.

9. The vibration generating device as claimed in claim 7, wherein the first frequency is greater than or equal to 200 Hz and less than or equal to 6 kHz, and wherein the second frequency is less than or equal to 600 Hz.

10. The vibration generating device as claimed in claim 7, wherein the housing includes a holder configured to hold the diaphragm, and wherein as viewed in the first direction, part of the diaphragm overlapping the holder is fixed to the holder.

11. The vibration generating device as claimed in claim 7, wherein the diaphragm is integrally formed with the housing.

12. The vibration generating device as claimed in claim 7, wherein the housing and the diaphragm are made of synthetic resin or made of metal.

13. A vibration generating device comprising:

a housing;

a diaphragm having a plate shape and supported by the housing, and configured to generate sound by vibrating in a first direction that is a thickness direction of the diaphragm; and a vibration providing part attached to the housing, and configured to vibrate the housing, wherein the vibration providing part includes:

a vibrator, an elastic supporter that is configured to support the vibrator so as to vibrate the vibrator in the first direction and a direction orthogonal to the first direction, and a drive part that is configured to vibrate the vibrator in the first direction and a second direction, said second direction being parallel with a plane of the diaphragm, said second direction intersecting the thickness direction, wherein the vibration providing part vibrates the housing in the first direction at a first frequency, and vibrates the housing in the second direction at a second frequency lower than the first frequency.

* * * * *